US012349159B2

(12) United States Patent
Li et al.

(10) Patent No.: US 12,349,159 B2
(45) Date of Patent: Jul. 1, 2025

(54) RESOURCE SCHEDULING METHOD AND APPARATUS AND UE

(71) Applicant: VIVO MOBILE COMMUNICATION CO., LTD., Dongguan (CN)

(72) Inventors: Gen Li, Dongguan (CN); Siqi Liu, Dongguan (CN); Zichao Ji, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 342 days.

(21) Appl. No.: 17/955,519

(22) Filed: Sep. 28, 2022

(65) Prior Publication Data
US 2023/0021455 A1    Jan. 26, 2023

Related U.S. Application Data

(63) Continuation of application No. PCT/CN2021/084042, filed on Mar. 30, 2021.

(30) Foreign Application Priority Data

Mar. 31, 2020  (CN) .......................... 202010247432.8

(51) Int. Cl.
H04W 72/23  (2023.01)
(52) U.S. Cl.
CPC .................................. H04W 72/23 (2023.01)
(58) Field of Classification Search
CPC ..................................................... H04W 72/23
See application file for complete search history.

(56) References Cited

U.S. PATENT DOCUMENTS

2010/0279628 A1*  11/2010  Love ..................... H04L 5/0091
                                                    455/70
2014/0086184 A1    3/2014  Guan et al.
(Continued)

FOREIGN PATENT DOCUMENTS

CN    102811495 A    12/2012
WO    2016114560 A1   7/2016
WO    2019158005 A1   8/2019

OTHER PUBLICATIONS

International Search Report issued in corresponding International Application No. PCT/CN2021/084042, mailed Jun. 30, 2021, 4 pages.
(Continued)

Primary Examiner — Brenda H Pham
(74) Attorney, Agent, or Firm — IPX PLLC

(57) ABSTRACT

The present disclosure provide a resource scheduling method, apparatus, and UE. The method includes: receiving target configuration information, where the target configuration information is used for configuring N candidate resource groups, the N candidate resource groups support scheduling by downlink control information (DCI) capable of simultaneously scheduling a plurality of resources, and at least one candidate resource group in the N candidate resource groups is a resource group including at least two candidate resources; performing a physical downlink control channel (PDCCH) blind detection in search spaces corresponding to the N candidate resource groups according to the target configuration information to obtain first DCI; and transmitting data on a target resource actually scheduled by the first DCI, where the target resource includes a candidate resource in one candidate resource group in the N candidate resource groups, and N is a positive integer.

20 Claims, 3 Drawing Sheets

(56) References Cited

U.S. PATENT DOCUMENTS

2017/0078126 A1\* 3/2017 Einhaus ............... H04L 1/0009
2017/0181135 A1\* 6/2017 Chen .................... H04L 5/0092
2019/0357183 A1 11/2019 Takeda et al.

OTHER PUBLICATIONS

Ericsson, "HARQ and scheduling enhancements for NR-U,", 3GPP TSG-RAN WG1 Meeting #99, R1-1912711, Nov. 2019.
Extended European Search Report issued in related European Application No. 21779800.8, mailed Jul. 6, 2023, 10 pages.

\* cited by examiner

RESOURCE SCHEDULING METHOD AND APPARATUS AND UE

CROSS-REFERENCE TO RELATED APPLICATIONS

This application is a continuation of International Application No. PCT/CN2021/084042, filed Mar. 30, 2021, which claims priority to Chinese Patent Application No. 202010247432.8, filed Mar. 31, 2020. The entire contents of each of the above-referenced applications are expressly incorporated herein by reference.

TECHNICAL FIELD

Embodiments of the present disclosure relate to the field of communication technologies, and in particular to a resource scheduling method and apparatus and UE.

BACKGROUND

Currently, Downlink Control Information (DCI) in a New Radio (NR) system only supports the scheduling of one carrier but does not support the simultaneous scheduling of a plurality of carriers.

However, in some scenarios, a network device (for example, a base station) and User Equipment (UE) need to schedule a plurality of carriers. For example, in a scenario of Dynamic Spectrum Sharing (DSS) between a 4G network system and a 5G network system, a plurality of carriers need to be separately scheduled between the network device and the UE through a plurality of pieces of DCI. That is, Physical Downlink Control Channel (PDCCH) corresponding to the carriers need to be shared to carry the plurality of pieces of DCI. As a result, the PDCCH overheads on the shared carriers are relatively high, that is, the PDCCH overheads are relatively high during the scheduling of the plurality of carriers.

SUMMARY

Embodiments of the present disclosure provide a resource scheduling method and apparatus and UE.

According to a first aspect, embodiments of the present disclosure provide a resource scheduling method. The method includes: receiving target configuration information, where the target configuration information is used for configuring N candidate resource groups, the N candidate resource groups support scheduling by downlink control information (DCI) capable of simultaneously scheduling a plurality of resources, and at least one candidate resource group in the N candidate resource groups is a resource group including at least two candidate resources; performing a physical downlink control channel PDCCH blind detection in search spaces corresponding to the N candidate resource groups according to the target configuration information to obtain first DCI; and transmitting data on a target resource actually scheduled by the first DCI, where the target resource includes a candidate resource in one candidate resource group in the N candidate resource groups, and N is a positive integer.

In some embodiments, one candidate resource includes one carrier of one serving cell configured for UE or a bandwidth part BWP configured for the UE.

In some embodiments, the target configuration information is used for configuring at least one of the following: a target resource group; a scheduled cell being configured to support scheduling by the DCI capable of simultaneously scheduling a plurality of resources; and a scheduling cell being configured to support scheduling by the DCI capable of simultaneously scheduling a plurality of resources, or the scheduling cell being configured to monitor the DCI capable of simultaneously scheduling a plurality of resources.

In some embodiments, the target resource group includes at least one of the following: at least one first resource group; or at least one second resource group, where the at least one first resource group is a resource group that is configured by the scheduling cell and is capable of being scheduled by the DCI capable of simultaneously scheduling a plurality of resources. The at least one second resource group and a first resource are capable of being simultaneously scheduled by the DCI capable of simultaneously scheduling a plurality of resources, the first resource is a self-scheduled resource configured by the scheduling cell, and the at least one second resource group is a cross-carrier scheduled resource group configured by the scheduling cell or a resource group on a serving cell different from the scheduling cell.

In some embodiments, in a case that the scheduled cell is configured to support scheduling with the scheduling cell by the DCI capable of simultaneously scheduling a plurality of resources, the target configuration information further includes: information that is configured by the scheduled cell and is about a scheduling cell capable of being jointly scheduled with the scheduled cell.

In some embodiments, if each candidate resource group includes at least two candidate resources, the N candidate resource groups satisfy any one of the following: in a case that the target configuration information is used for configuring the at least one first resource group, the N candidate resource groups are the at least one first resource group; in a case that the target configuration information is used for configuring the at least one second resource group, the each candidate resource group includes a resource group formed by a resource in one second resource group and the first resource; in a case that the scheduled cell is configured to support scheduling with the scheduling cell by the DCI capable of simultaneously scheduling a plurality of resources, the N candidate resource groups include a resource group formed by a resource corresponding to the scheduling cell and a resource corresponding to the scheduled cell and/or a resource group formed by a resource corresponding to the scheduled cell; or in a case that the scheduling cell is configured to support scheduling by the DCI capable of simultaneously scheduling a plurality of resources, or the scheduling cell is configured to monitor the DCI capable of simultaneously scheduling a plurality of resources, the N candidate resource groups include a resource corresponding to the scheduling cell and a resource corresponding to the scheduled cell.

In some embodiments, the N candidate resource groups satisfy any one of the following: in a case that the target configuration information is used for configuring the at least one first resource group, the N candidate resource groups include the at least one first resource group and/or a resource group formed by the first resource; in a case that the target configuration information is used for configuring the at least one second resource group, the N candidate resource groups include the at least one second resource group, a resource group formed by the first resource, and/or a resource group formed by a resource in each second resource group and the first resource; in a case that the scheduled cell is configured to support scheduling with the scheduling cell by the DCI capable of simultaneously scheduling a plurality of resources, the N candidate resource groups include a resource group formed by the first resource, a resource group formed by a resource corresponding to the scheduling cell and a resource corresponding to the scheduled cell, and/or a resource group formed by a resource corresponding to the scheduled cell; and in a case that the scheduling cell is configured to support scheduling by the DCI capable of simultaneously scheduling a plurality of resources, or the scheduling cell is configured to monitor the DCI capable of simultaneously scheduling a plurality of resources, the N candidate resource groups include a resource group formed by the first resource, a resource group formed by a resource corresponding to the scheduling cell and a resource corresponding to the scheduled cell, and/or a resource group formed by a resource corresponding to the scheduled cell.

In some embodiments, "performing a PDCCH blind detection in search spaces corresponding to the N candidate resource groups according to the target configuration information" includes: determining a first DCI length for scheduling each candidate resource group according to the target configuration information, and determining a target search space for scheduling the each candidate resource group; and performing the PDCCH blind detection in a target search space of a corresponding candidate resource group according to the first DCI length corresponding to the each candidate resource group, where the search spaces corresponding to the N candidate resource groups include target search spaces of all candidate resource groups.

In some embodiments, the target configuration information includes N pieces of first configuration information, and one piece of first configuration information corresponds to one candidate resource group; and the "determining a first DCI length for scheduling each candidate resource group according to the target configuration information" includes: determining, according to each piece of first configuration information and field information of at least one DCI field, a first field length of each DCI field corresponding to a candidate resource group of the each first configuration information; and determining the first DCI length of the each candidate resource group according to the first field length of the each DCI field.

In some embodiments, the "determining the first DCI length of the each candidate resource group according to the first field length of the each DCI field" includes: determining an initial DCI length of the each candidate resource group according to the first field length of the each DCI field; and using a second DCI length as the first DCI length of the each candidate resource group, where the second DCI length is an initial DCI length of a candidate resource group with the largest initial DCI length in the N candidate resource groups.

In some embodiments, the "determining the first DCI length of the each candidate resource group according to the first field length of the each DCI field" includes: determining a target field length of the each DCI field according to the first field length of the each DCI field; determining a third DCI length according to the target field length of the each DCI field; and using the third DCI length as the first DCI length of the each candidate resource group, where a target field length of any DCI field is a first field length being the largest field length in the first field length of the any DCI field in the N candidate resource groups; and the third DCI length is a sum of target field lengths of the DCI fields.

In some embodiments, if the each candidate resource group includes the at least two candidate resources, the determining a target search space for scheduling the each candidate resource group includes: determining the target search space for scheduling the each candidate resource group according to first information; or, using a first search space of the each candidate resource group as the target search space for scheduling the corresponding candidate resource group; or, using a target search space set as the target search space for scheduling the each candidate resource group, where the first information is indication information used for indicating the N candidate resource groups or at least one predefined value; and each predefined value corresponds to one search space, and the each candidate resource group corresponds to one predefined value; and the target search space set includes first search spaces of all the candidate resource groups; a first search space of any candidate resource group is a search space of one candidate resource in the any candidate resource group; and a search space of the one candidate resource is a search space when the one candidate resource is separately scheduled.

In some embodiments, the first information includes at least one of the following: an identifier of each candidate resource group, a preset identifier, or an identifier configured in a radio resource control RRC message.

In some embodiments, the N candidate resource groups include at least one group; and the "determining a first DCI length for scheduling each candidate resource group according to the target configuration information, and determining a target search space for scheduling the each candidate resource group" includes: determining a first DCI length for scheduling a candidate resource group in each group according to the target configuration information, and determine a target search space for scheduling the candidate resource group in the each group, where the first DCI in all candidate resource groups in one group has the same length, and target search spaces of all the candidate resource groups in the one group are the same.

In some embodiments, the at least one group is obtained through division based on a first candidate resource or at least one second candidate resource, where the first candidate resource is one candidate resource self-scheduled by the scheduling cell, and one second candidate resource is one candidate resource cross-carrier scheduled by the scheduling cell.

In some embodiments, the N candidate resource groups include a first group and a second group, where the at least one group is obtained through division based on the first candidate resource, and each first group includes a candidate resource group including the first candidate resource; and each second group includes a candidate resource group formed by the one second candidate resource; and if the at least one group is obtained through division based on the at least one second candidate resource, candidate resource groups included in the each first group all include one same second candidate resource; and the each second group includes a candidate resource group formed by the first candidate resource.

In some embodiments, a first DCI length of the each candidate resource group in any first group is a first DCI length of a candidate resource group with the largest first DCI length in the any first group; and a first DCI length of a candidate resource group in any second group is a first DCI length when a candidate resource in the candidate resource group in the any second group is separately scheduled.

In some embodiments, if the at least one group is obtained through division based on the first candidate resource, a target search space of the candidate resource group in the each first group is a search space when the first candidate resource is separately scheduled; and a target search space of the candidate resource group in the any second group is a search space when a second candidate resource in the candidate resource group in the any second group is separately scheduled; and if the at least one group is obtained through division based on the at least one second candidate resource, a target search space of a candidate resource group in the any first group is a search space when a second candidate resource in a candidate resource group in the any first group is separately scheduled; and a target search space of the candidate resource group in the any second group is a search space when the candidate resource in the candidate resource group in the any second group is separately scheduled.

In some embodiments, the first DCI length of the each candidate resource group is associated with at least one serving cell, or the first DCI length of the each candidate resource group is associated with at least one serving cell group, where each serving cell corresponds to one DCI length budget, and each serving cell group corresponds to one DCI length budget.

In some embodiments, the DCI length budget corresponding to the each serving cell group is obtained based on the DCI length budget of the each serving cell in the corresponding serving cell group.

In some embodiments, if a first DCI length of a first candidate resource group is associated with a first serving cell, after the determining a first DCI length for scheduling each candidate resource group, the method further includes: determining, according to the first DCI length of the first candidate resource group, whether the first serving cell satisfies a DCI length budget of the first serving cell; or, if a first DCI length of a first candidate resource group is associated with a first serving cell group, after the determining a first DCI length for scheduling each candidate resource group, the method further includes: determining, according to the first DCI length of the first candidate resource group, whether the first serving cell group satisfies a DCI length budget of the first serving cell group, where the first candidate resource group is at least one of the N candidate resource groups.

In some embodiments, the target search space includes at least one of the following: a search space time-frequency monitoring position or a control channel element (CCE).

In some embodiments, in a case that N is 1, the first DCI does not include a target field; and in a case that N is greater than 1, a field length of the target field is a value obtained by rounding up $\log 2(N)$ or a field length of the target field is a preset value, where the target field is a DCI field used for indicating the N candidate resource groups.

In some embodiments, an identifier of one candidate resource group includes at least one of the following: identification information ID configured for the one candidate resource group, an identifier of one candidate resource in the one candidate resource group, or an identifier and a target bit of one candidate resource in the one candidate resource group, where one target bit is used for indicating whether the corresponding candidate resource group includes a plurality of candidate resources.

According to a second aspect, the embodiments of the present disclosure provide a resource scheduling apparatus. The apparatus includes: a receiving module, configured to receive target configuration information, where the target configuration information is used for configuring N candidate resource groups, the N candidate resource groups support scheduling by downlink control information DCI capable of simultaneously scheduling a plurality of resources, and at least one candidate resource group in the N candidate resource groups is a resource group including at least two candidate resources; an acquisition module, configured to perform a physical downlink control channel PDCCH blind detection in search spaces corresponding to the N candidate resource groups according to the target configuration information received by the receiving module to obtain first DCI; and a transmission module, configured to transmit data on a target resource actually scheduled by the first DCI obtained by the acquisition module, where the target resource includes a candidate resource in one candidate resource group in the N candidate resource groups, and N is a positive integer.

In some embodiments, one candidate resource includes one carrier of one serving cell configured for UE or a bandwidth part BWP configured for the UE.

In some embodiments, the target configuration information is used for configuring at least one of the following: a target resource group; a scheduled cell being configured to support scheduling by the DCI capable of simultaneously scheduling a plurality of resources; or a scheduling cell being configured to support scheduling by the DCI capable of simultaneously scheduling a plurality of resources, or the scheduling cell being configured to monitor the DCI capable of simultaneously scheduling a plurality of resources.

In some embodiments, the target resource group includes at least one of the following: at least one first resource group; or at least one second resource group, where the at least one first resource group is a resource group that is configured by the scheduling cell and is capable of being scheduled by the DCI capable of simultaneously scheduling a plurality of resources. The at least one second resource group and a first resource are capable of being simultaneously scheduled by the DCI capable of simultaneously scheduling a plurality of resources, the first resource is a self-scheduled resource configured by the scheduling cell, and the at least one second resource group is a cross-carrier scheduled resource group configured by the scheduling cell or a resource group on a serving cell different from the scheduling cell.

In some embodiments, in a case that the scheduled cell is configured to support scheduling with the scheduling cell by the DCI capable of simultaneously scheduling a plurality of resources, the target configuration information further includes: information that is configured by the scheduled cell and is about a scheduling cell capable of being jointly scheduled with the scheduled cell.

In some embodiments, if each candidate resource group includes at least two candidate resources, the N candidate resource groups satisfy any one of the following: in a case that the target configuration information is used for configuring the at least one first resource group, the N candidate resource groups are the at least one first resource group; in a case that the target configuration information is used for configuring the at least one second resource group, the each candidate resource group includes a resource group formed by a resource in one second resource group and the first resource; in a case that the scheduled cell is configured to support scheduling with the scheduling cell by the DCI capable of simultaneously scheduling a plurality of resources, the N candidate resource groups include a resource group formed by a resource corresponding to the scheduling cell and a resource corresponding to the scheduled cell and/or a resource group formed by a resource corresponding to the scheduled cell; or in a case that the scheduling cell is configured to support scheduling by the DCI capable of simultaneously scheduling a plurality of resources, or the scheduling cell is configured to monitor the DCI capable of simultaneously scheduling a plurality of resources, the N candidate resource groups include a resource corresponding to the scheduling cell and a resource corresponding to the scheduled cell.

In some embodiments, the N candidate resource groups satisfy any one of the following: in a case that the target configuration information is used for configuring the at least one first resource group, the N candidate resource groups include the at least one first resource group and/or a resource group formed by the first resource; in a case that the target configuration information is used for configuring the at least one second resource group, the N candidate resource groups include the at least one second resource group, a resource group formed by the first resource, and/or a resource group formed by a resource in each second resource group and the first resource; in a case that the scheduled cell is configured to support scheduling with the scheduling cell by the DCI capable of simultaneously scheduling a plurality of resources, the N candidate resource groups include a resource group formed by the first resource, a resource group formed by a resource corresponding to the scheduling cell and a resource corresponding to the scheduled cell, and/or a resource group formed by a resource corresponding to the scheduled cell; and in a case that the scheduling cell is configured to support scheduling by the DCI capable of simultaneously scheduling a plurality of resources, or the scheduling cell is configured to monitor the DCI capable of simultaneously scheduling a plurality of resources, the N candidate resource groups include a resource group formed by the first resource, a resource group formed by a resource corresponding to the scheduling cell and a resource corresponding to the scheduled cell, and/or a resource group formed by a resource corresponding to the scheduled cell.

In some embodiments, the acquisition module is further configured to: determine a first DCI length for scheduling each candidate resource group according to the target configuration information, and determine a target search space for scheduling the each candidate resource group; and perform the PDCCH blind detection in a target search space of a corresponding candidate resource group according to the first DCI length corresponding to the each candidate resource group.

In some embodiments, the target configuration information includes N pieces of first configuration information, and one piece of first configuration information corresponds to one candidate resource group; and the acquisition module is further configured to: determine, according to each piece of first configuration information and field information of at least one DCI field, a first field length of each DCI field corresponding to a candidate resource group of the each first configuration information; and determine the first DCI length of the each candidate resource group according to the first field length of the each DCI field.

In some embodiments, the acquisition module is further configured to use a second DCI length as the first DCI length of the each candidate resource group, where the second DCI length is an initial DCI length of a candidate resource group with the largest initial DCI length in the N candidate resource groups.

In some embodiments, the acquisition module is further configured to: determine a third DCI length according to the target field length of the each DCI field; and use the third DCI length as the first DCI length of the each candidate resource group, where a target field length of any DCI field is a first field length being the largest field length in the first field length of the any DCI field in the N candidate resource groups; and the third DCI length is a sum of target field lengths of the DCI fields.

In some embodiments, if the each candidate resource group includes the at least two candidate resources, the acquisition module is further configured to: determine the target search space for scheduling the each candidate resource group according to first information; or, use a first search space of the each candidate resource group as the target search space for scheduling the corresponding candidate resource group; or, use a target search space set as the target search space for scheduling the each candidate resource group, where the first information is indication information used for indicating the N candidate resource groups or at least one predefined value; indication information of the each candidate resource group corresponds to one search space; and each predefined value corresponds to one search space, and the each candidate resource group corresponds to one predefined value; and the target search space set includes first search spaces of all the candidate resource groups; a first search space of any candidate resource group is a search space of one candidate resource in the any candidate resource group; and a search space of the one candidate resource is a search space when the one candidate resource is separately scheduled.

In some embodiments, the first information includes at least one of the following: an identifier of each candidate resource group, a preset identifier, or an identifier configured in a radio resource control RRC message.

In some embodiments, the N candidate resource groups include at least one group; and the acquisition module is further configured to: determine a first DCI length for scheduling a candidate resource group in each group according to the target configuration information, and determine a target search space for scheduling the candidate resource group in the each group, where the first DCI in all candidate resource groups in one group has the same length, and target search spaces of all the candidate resource groups in the one group are the same.

In some embodiments, the at least one group is obtained through division based on a first candidate resource or at least one second candidate resource, where the first candidate resource is one candidate resource self-scheduled by the scheduling cell, and one second candidate resource is one candidate resource cross-carrier scheduled by the scheduling cell.

In some embodiments, the N candidate resource groups include a first group and a second group, where the at least one group is obtained through division based on the first candidate resource, and each first group includes a candidate resource group including the first candidate resource; and each second group includes a candidate resource group formed by the one second candidate resource; and if the at least one group is obtained through division based on the at least one second candidate resource, candidate resource groups included in the each first group all include one same second candidate resource; and the each second group includes a candidate resource group formed by the first candidate resource.

In some embodiments, a first DCI length of the each candidate resource group in any first group is a first DCI length of a candidate resource group with the largest first DCI length in the any first group; and a first DCI length of a candidate resource group in any second group is a first DCI length when a candidate resource in the candidate resource group in the any second group is separately scheduled.

In some embodiments, if the at least one group is obtained through division based on the first candidate resource, a target search space of the candidate resource group in the each first group is a search space when the first candidate resource is separately scheduled; and a target search space of the candidate resource group in the any second group is a search space when a second candidate resource in the candidate resource group in the any second group is separately scheduled; and if the at least one group is obtained through division based on the at least one second candidate resource, a target search space of a candidate resource group in the any first group is a search space when a second candidate resource in a candidate resource group in the any first group is separately scheduled; and a target search space of the candidate resource group in the any second group is a search space when the candidate resource in the candidate resource group in the any second group is separately scheduled.

In some embodiments, the first DCI length of the each candidate resource group is associated with at least one serving cell, or the first DCI length of the each candidate resource group is associated with at least one serving cell group, where each serving cell corresponds to one DCI length budget, and each serving cell group corresponds to one DCI length budget.

In some embodiments, the DCI length budget corresponding to the each serving cell group is obtained based on the DCI length budget of the each serving cell in the corresponding serving cell group.

In some embodiments, the resource scheduling apparatus provided in the present disclosure further includes: a determining module, configured to: if a first DCI length of a first candidate resource group is associated with a first serving cell, after the acquisition module determines a first DCI length for scheduling each candidate resource group, determine, according to the first DCI length of the first candidate resource group, whether the first serving cell satisfies a DCI length budget of the first serving cell; or, if a first DCI length of a first candidate resource group is associated with a first serving cell group, after the acquisition module determines a first DCI length for scheduling each candidate resource group, determine, according to the first DCI length of the first candidate resource group, whether the first serving cell group satisfies a DCI length budget of the first serving cell group, where the first candidate resource group is at least one of the N candidate resource groups.

In some embodiments, the target search space includes at least one of the following: a search space time-frequency monitoring position or a control channel element (CCE).

In some embodiments, in a case that N is 1, the first DCI does not include a target field; and in a case that N is greater than 1, a field length of the target field is a value obtained by rounding up log 2(N) or a field length of the target field is a preset value,
  where the target field is a DCI field used for indicating the
    N candidate resource groups.

In some embodiments, an identifier of one candidate resource group includes at least one of the following: identification information ID configured for the one candidate resource group, an identifier of one candidate resource in the one candidate resource group, or an identifier and a target bit of one candidate resource in the one candidate resource group, where one target bit is used for indicating whether the corresponding candidate resource group includes a plurality of candidate resources.

According to a third aspect, the embodiments of the present disclosure provide user equipment UE, including a processor, a memory, and a computer program stored in the memory and capable of being run on the processor, where the computer program, when being executed by the processor, implements the steps of the resource scheduling method in the first aspect.

According to a fourth aspect, the embodiments of the present disclosure provide a computer-readable storage medium, storing a computer program, where the computer program, when being executed by a processor, implements the steps of the resource scheduling method in the first aspect.

It needs to be noted that the UE in the third aspect in the embodiments of the present disclosure may be formed by integrating functional modules such as the receiving module, the acquisition module, the transmission module, and the determining module in the second aspect and implements the functions of the functional modules in the second aspect. For example, the processor in the third aspect may be formed by integrating functional modules such as the acquisition module and the determining module in the second aspect, and the processor can implement the functions of the acquisition module and the determining module in the second aspect.

In the embodiments of the present disclosure, the resource scheduling apparatus or the UE may receive target configuration information, and learn that the target configuration information configures N candidate resource groups, the N candidate resource groups support scheduling by downlink control information DCI capable of simultaneously scheduling a plurality of resources, and at least one candidate resource group in the N candidate resource groups is a resource group including at least two candidate resources. Subsequently, a PDCCH blind detection may be performed in search spaces corresponding to the N candidate resource groups according to the target configuration information to obtain first DCI. Finally, data may be transmitted on a target resource actually scheduled by the first DCI, and the target resource includes a candidate resource in one candidate resource group in the N candidate resource groups. In this way, the embodiments of the present disclosure provide a mechanism of using one piece of DCI to simultaneously schedule a plurality of resources, so that it is implemented that the first DCI is used to schedule a plurality of resources represented by the N candidate resource groups. Therefore, in a scenario in which the UE schedules a plurality of resources represented by the N candidate resource groups, PDCCHs of scheduled carriers only need to carry the first DCI but do not need to carry excessive DCI for scheduling a single resource, so that the PDCCH overheads on the scheduled carriers can be reduced.

DETAILED DESCRIPTION

Figure 1:
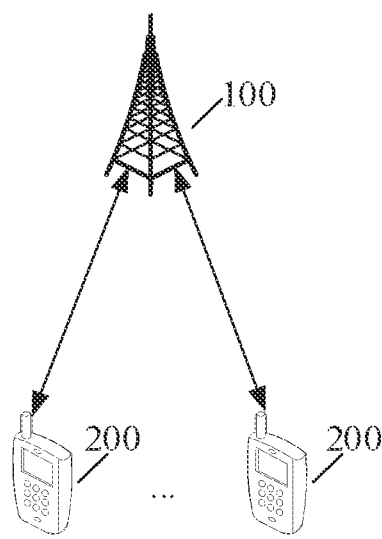
FIG. 1 is a possible schematic structural diagram of a communications system according to an embodiment of the present disclosure.

The technical solutions in embodiments of the present disclosure are clearly described in the following with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It needs to be noted that "/" herein means "or". For example, A/B may represent A or B. "and/or" herein describes only an association relationship for describing associated objects and represents that three relationships may exist. For example, A and/or B may represent the following three cases: Only A exists, both A and B exist, and only B exists.

It needs to be noted that to help clearly describe the technical solutions in the embodiments of the present application, terms such as "first" and "second" are used in the embodiments of the present application to distinguish between same items or similar items that have basically same functions or purposes. A person skilled in the art may understand that the terms such as "first" and "second" do not limit a quantity or an execution sequence. For example, a first candidate resource and a second candidate resource are used for distinguishing between different candidate resources rather than describing a specific order of the candidate resources.

It needs to be noted that, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, use of the word "example" or "for example" or the like is intended to present a related concept in a specific manner.

It needs to be noted that "of", "relevant", and "corresponding" may be sometimes used interchangeably in the embodiments of the present application. It should be noted that there expressions convey consistent meanings when differences between these expressions are not emphasized. In the embodiments of the present application, "plurality" means two or more.

Some terms in the embodiments of the present disclosure are described as follows:

1. Cross-Carrier Scheduling Configuration of NR Rel15

In NR Rel15, both a Primary Cell (Pcell) and Secondary Cell (Scell) of UE may be configured to be self-scheduled. The Scell may be configured to be cross-carrier scheduled by the Pcell or another Scell. In addition, when a serving cell is a Pcell and is configured to be self-scheduled, DCI in a DCI format of DCI format 0_1 and DCI format 1_1 may be configured for UE to indicate whether there is a carrier indicator field (CIF). When a serving cell is an Scell and is configured to be cross-carrier scheduled, an identifier of a serving cell (serving cell ID) for scheduling the Scell and a CIF value in DCI when the Scell is scheduled may be configured for the UE.

At most four Downlink Bandwidth part (DL BWP) and four Uplink Bandwidth part (UL BWP) UL BWPs may be configured for one UE. If a serving cell of UE includes a supplementary uplink (SUL), the UE may further configure at most four BWPs on the SUL. At any specific moment, the UE has one active uplink BWP and one active downlink BWP.

It may be understood that after entering a connected state, the UE may communicate with a network device such as a base station through a plurality of Component Carrier (CC) simultaneously. The network device designates one Primary Component Carrier (PCC) for the UE through an explicit configuration or according to a protocol agreement, and other component carriers are referred to as Secondary Component Carrier (SCC). A serving cell on the primary component carrier (PCC) is referred to as a Pcell, and a serving cell on the secondary component carriers (SCC) is referred to as an Scell.

In addition, the DCI is downlink control information sent by the base station to the UE, and the DCI may be sent in a Common search space (CSS) or a UE-specific search space (USS). In addition, a plurality of DCI formats are defined in an NR system. The DCI formats are, for example, DCI format 0_0, DCI format 0_1, DCI format 1_0, DCI format 1_1, DCI format 2_0, DCI format 2_1, DCI format 2_2, and DCI format 2_3.

It needs to be noted that the search space is configured for each BWP. A maximum quantity of search spaces that can be configured for one BWP is 10, a maximum quantity of search spaces that can be configured for one cell is 40, and a search space index configured in one cell is unique. When a serving cell 1 (that is, a scheduled cell, for example, Scell) is configured to be scheduled by a served cell 2 (that is, a scheduling cell), there is no optional field in search spaces configured on BWPs of the scheduled cell, and there are only a search space index and blind detection candidate PDCCH quantities at various aggregation levels. In a search space configured on an active BWP of the scheduling cell, a search space with the same search space index as a search space configured on an active BWP on the scheduled cell is used as a search space of cross-carrier scheduling.

II. PDCCH of NR Rel15:

In NR Rel15, time domain configuration information of a search space set includes a detection period, a slot offset, a slot quantity, a symbol position, and a control resource set index. In addition, each search space is associated with one Control Resource Set (CORESET) to acquire a candidate position of a frequency domain and a symbol quantity of a time domain. A transmission configuration indicator (TCI) state transmitted by a PDCCH is obtained according to a TCI state of an associated CORESET.

A Control Channel Elements (CCE) index of each candidate PDCCH of UE in a CORESET in NR Rel15 is determined according to a given search space function. In some embodiments, for a search space set s associated with a control resource set p, in a slot $n_{s,f}^{\mu}$, a CCE index of a candidate control channel $m_{s,n_{CI}}^{\mu}$ with an aggregation level of L is given through Formula (1) below:

$$L \cdot \left\{ \left( Y_{p,n_{s,f}^{\mu}} + \left\lfloor \frac{m_{s,n_{CI}}^{\mu} \cdot N_{CCE,p}}{L \cdot M_{s,max}^{(L)}} \right\rfloor + n_{CI} \right) \mod \lfloor N_{CCE,p}/L \rfloor \right\} + i, \quad (1)$$

where for a common search space, $Y_{p,n_{s,f}^{\mu}}=0$; and for a UE-specific search space, $Y_{p,n_{s,f}^{\mu}}=(A_p \cdot Y_{p,n_{s,f}^{\mu}-1}) \mod D$, where $Y_{p,-1}=n_{RNTI} \neq 0$, D=65537, and $A_p=39872$. In addition, $i \in \{0, \ldots, L-1\}$, i is a positive integer, and $n_{CI}$ is a CIF value in DCI. It can be seen that a formula for calculating a candidate PDCCH search space is related to a CIF of a cell that the DCI needs to schedule.

It needs to be noted that the resource scheduling method provided in the embodiments of the present disclosure may be applied to a process of scheduling a plurality of resources for UE in an NR system, for example, a process of using a scheduled carrier to self-schedule resources on the scheduled carrier and using a scheduled carrier to cross-carrier schedule resources on another carrier.

It may be understood that the process of scheduling resources for the UE may be a process of scheduling resources for the UE based on serving cells. That is, the resources scheduled for the UE are resources corresponding to these serving cells, that is, resources in these serving cells, for example, carriers (or referred to as component carriers) corresponding to these serving cells.

For example, the resource scheduling method provided in the embodiments of the present disclosure may be applied to a process of scheduling a plurality of resources on a shared carrier in a scenario of DSS between a 4G network system and a 5G network system.

However, in the NR system, at present, one piece of DCI can be used to schedule uplink data and downlink data on only one carrier (self-scheduling or cross-carrier scheduling). However, it is not supported that one piece of DCI is used to schedule a plurality of carriers. That is, it is not supported that one piece of DCI is used to schedule a plurality of resources. In this case, in a scenario of Dynamic Spectrum Sharing (DSS) between a 4G network system and a 5G network system, a plurality of carriers need to be separately scheduled between the network device and the UE through a plurality of pieces of DCI. That is, PDCCHs corresponding to the carriers need to be shared to carry the plurality of pieces of DCI. As a result, the PDCCH overheads on the shared carriers are relatively high, that is, the PDCCH overheads are relatively high during the scheduling of the plurality of carriers.

For the resource scheduling method and apparatus and the UE provided in the embodiments of the present disclosure, target configuration information may be received, it may be learned that the target configuration information configures N candidate resource groups, the N candidate resource groups support scheduling by downlink control information DCI capable of simultaneously scheduling a plurality of resources, and at least one candidate resource group in the N candidate resource groups is a resource group including at least two candidate resources. Subsequently, a PDCCH blind detection may be performed in search spaces corresponding to the N candidate resource groups according to the target configuration information to obtain first DCI. Finally, data may be transmitted on a target resource actually scheduled by the first DCI, and the target resource includes a candidate resource in one candidate resource group in the N candidate resource groups. In this way, the embodiments of the present disclosure provide a mechanism of using one piece of DCI to simultaneously schedule a plurality of resources, so that it is implemented that the first DCI is used to schedule a plurality of resources represented by the N candidate resource groups. Therefore, in a scenario in which the UE schedules a plurality of resources represented by the N candidate resource groups, PDCCHs of scheduled carriers only need to carry the first DCI but do not need to carry excessive DCI for scheduling a single resource, so that the PDCCH overheads on the scheduled carriers can be reduced.

The technical solutions provided in the present disclosure may be applied to various communications systems such as a 5G communications system, a future evolved system or a system integrating several types of communication. A plurality of application scenarios may be included. The scenarios are, for example, Machine to Machine (M2M), D2M, macro-micro communication, enhanced mobile broadband (eMBB), ultra reliable & low latency communication (uRLLC), and massive machine type communication (mMTC). These scenarios include, but not limited to, scenarios such as communication between terminal devices or communication between network devices or communication between a network device and a terminal device. The embodiments of the present disclosure may be applied to communication between a network device and a terminal device, communication between terminal devices or communication between network devices in a 5G communications system.

FIG. 1 is a possible schematic structural diagram of a communications system according to an embodiment of the present disclosure. As shown in FIG. 1, the communications system includes at least one network device 100 (only one network device is shown in FIG. 1) and one or more UEs 200 connected to each network device 100. In some embodiments, one network device 100 may communicate with one or more connected UEs 200.

The network device (for example, the foregoing network device 100) 100 may be a base station, a core network device, a Transmission and Reception Point (TRP), a relay station, an access point, or the like. The network device 100 may be a Base Transceiver Station (BTS) in a Global System for Mobile Communications (GSM) or Code Division Multiple Access (CDMA) network, or may be an NB (NodeB) in Wideband Code Division Multiple Access (WCDMA), or may be an eNB or eNodeB (evolved NodeB) in LTE. In some embodiments, the network device 100 may be a radio controller in a Cloud Radio Access Network (CRAN) scenario. In some embodiments, the network device 100 may be a network device in a 5G communications system or a network device in a future evolved network. However, the terms do not constitute a limitation on the present disclosure.

The UE (for example, the foregoing UE 200) is a device that provides voice and/or data connectivity to a user, a handheld device with a wired/wireless connection function or another processing device connected to a wireless modem. The UE may communicate with one or more core network devices through a Radio Access Network (RAN). The UE may be a mobile terminal, for example, a mobile phone (or referred to as a "cellular" phone) and a computer with a mobile terminal, or may be a portable, pocket-sized, handheld, computer built-in, or in-vehicle mobile device, which exchanges voice and/or data with the RAN, for example, a device such as a Personal Communication Service (PCS) phone, a cordless phone, a Session Initiation Protocol (SIP) phone, a Wireless Local Loop (WLL) station, and a Personal Digital Assistant (PDA). The UE may also be referred to as a user agent, a terminal device, or the like. In an example, in the embodiments of the present disclosure, FIG. 1 shows an example in which the UE 200 is a mobile phone.

In addition, to more clearly show a connection relationship between the network device 100 and the UE 200, the connection relationship between the network device 100 and the UE 200 is illustrated by a solid-line connection in FIG. 1. In actual implementation, a wireless connection may be established between the network device 100 and the UE 200 shown in FIG. 1.

The resource scheduling method provided in the embodiments of the present disclosure may be performed by a resource scheduling apparatus, UE, a Central Processing Unit (CPU) of the UE or functional modules configured to perform the resource scheduling method in the UE. In the embodiments of the present disclosure, an example in which UE performs the resource scheduling method is used to describe the resource scheduling method provided in the embodiments of the present disclosure. In some embodiments, the resource scheduling apparatus provided in the embodiments of the present disclosure may be implemented by UE.

It needs to be noted that sequence numbers of the foregoing processes do not mean execution sequences in the description of specific embodiments. The execution sequences of the processes should be determined according to functions and internal logic of the processes, and should not be construed as any limitation on the implementation processes of the embodiments of this application.

The resource scheduling method and the UE provided in the embodiments of the present disclosure are described below in detail with resource to the accompanying drawings and by using specific embodiments and application scenarios thereof.

Figure 2:
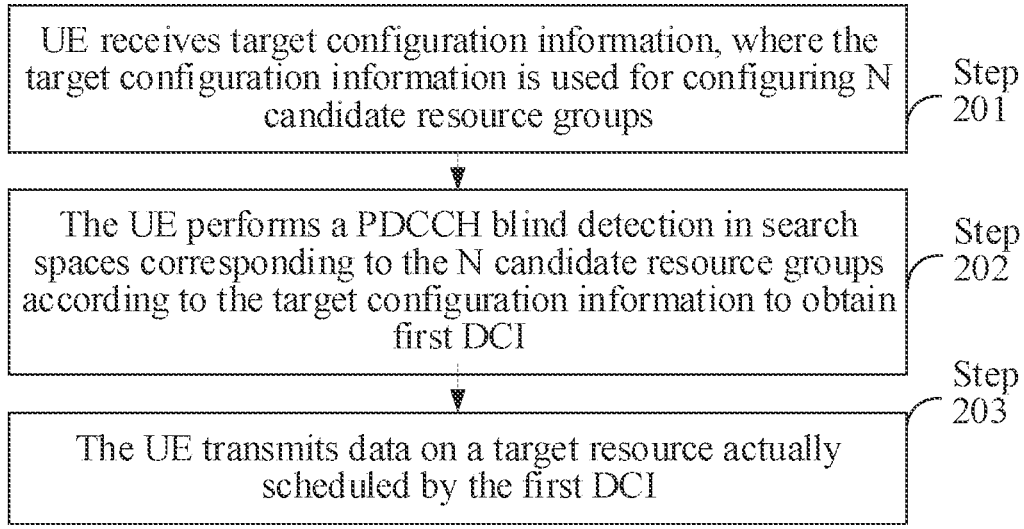
FIG. 2 is a schematic flowchart 1 of a resource scheduling method according to an embodiment of the present disclosure.

Based on the communications system shown in FIG. 1, embodiments of the present disclosure provide a resource scheduling method. As shown in FIG. 2, the resource scheduling method may be applied to user equipment UE. The resource scheduling method may include the following steps 201 to 203.

Step 201: UE receives target configuration information, where the target configuration information is used for configuring N candidate resource groups.

The target configuration information is used for configuring N candidate resource groups. The N candidate resource groups support scheduling by downlink control information DCI capable of simultaneously scheduling a plurality of resources. At least one candidate resource group in the N candidate resource groups is a resource group including at least two candidate resources. N is a positive integer.

Each candidate resource group in the at least one candidate resource group includes two candidate resources.

In some embodiments, the format of DCI that can be used currently to schedule one resource may be reused as the format of the DCI capable of simultaneously scheduling a plurality of resources, or the format of the DCI capable of simultaneously scheduling a plurality of resources may be different from the format of the DCI that can be used currently to schedule one resource.

In some embodiments, in the embodiments of the present disclosure, the DCI that can be used to schedule one resource may be used to schedule one resource.

Correspondingly, the network device may send the foregoing target configuration information to the UE.

In some embodiments, the foregoing target configuration information may be specified in a protocol or may be generated by the network device based on the DCI capable of simultaneously scheduling a plurality of resources.

In some embodiments, in the embodiments of the present disclosure, one candidate resource includes one carrier (for example, a component carrier) of one serving cell configured for UE or a BWP configured for the UE.

It needs to be noted that, in the embodiments of the present disclosure, when a resource in one serving cell is scheduled for the UE, for example, a carrier or a BWP in the serving cell is scheduled, the serving cell may be scheduled for the UE. For a resource group formed by two or more resources scheduled for the UE, two or more corresponding serving cells may be scheduled for the UE.

In some embodiments, in the resource scheduling method provided in the embodiments of the present disclosure, in a scenario of scheduling a resource in one serving cell for the UE, a carrier (for example, an active carrier) corresponding to the serving cell may be scheduled, or one or more BWPs in the serving cell may be scheduled.

In some embodiments, the target configuration information is used for configuring at least one of the following configuration items a to c:

Configuration item a: a target resource group.

In some embodiments, the target resource group includes one or more resource groups. Each resource group may include at least one resource (that is, the DCI capable of simultaneously scheduling a plurality of resources supports scheduling of one resource).

In some embodiments, the "target resource group" may include at least one of the following a1 or a2.

Configuration item a1: at least one first resource group.

The at least one first resource group is a resource group that is configured by the scheduling cell and is capable of being scheduled by the DCI capable of simultaneously scheduling a plurality of resources.

In some embodiments, the at least one first resource group is configured in a configuration field of the scheduling cell. For example, the scheduling cell may be a Pcell. The at least one first resource group may be configured based on a configuration field of the Pcell.

In some embodiments, in a case that the target configuration information is used for configuring the at least one first resource group, the target configuration information includes indication information of each first resource group, for example, an identifier (for example, an Identity document (ID)) of each first resource group.

For example, in a case that the at least one first resource group includes a plurality of resource groups, the target configuration information may use a list form to reflect indication information of each first resource group in the at least one first resource group.

In some embodiments, an identifier of one resource group (for example, a first resource group) includes at least one of the following: an ID configured for the one resource group, an identifier of one resource (for example, a specific resource in the resource group, for example, a resource corresponding to a primary cell) in the one resource group, or an identifier and a target bit of one resource in the one resource group, where one target bit is used for indicating whether the corresponding resource group includes a plurality of resources.

Configuration item a2: at least one second resource group.

The at least one second resource group and a first resource are capable of being simultaneously scheduled by the DCI capable of simultaneously scheduling a plurality of resources. The first resource is a self-scheduled resource configured by the scheduling cell. The at least one second resource group is a cross-carrier scheduled resource group configured by the scheduling cell or a resource group on a serving cell different from the scheduling cell.

In some embodiments, the at least one second resource group is configured in a configuration field of the scheduling cell. For example, the scheduling cell may be a Pcell. The at least one second resource group may be configured based on a configuration field of the Pcell.

In some embodiments, in a case that the target configuration information is used for configuring the at least one second resource group, the target configuration information includes indication information of each second resource group, for example, an identifier of each second resource group.

For example, in a case that the at least one second resource group includes a plurality of resource groups, the target configuration information uses a list form to reflect indication information of each second resource group in the at least one second resource group.

Configuration item b: a scheduled cell being configured to support scheduling with the scheduling cell by the DCI capable of simultaneously scheduling a plurality of resources.

The scheduled cell and another serving cell may be scheduled by the same DCI capable of simultaneously scheduling a plurality of resources.

For example, the scheduled cell and the scheduling cell may be scheduled by the same DCI capable of simultaneously scheduling a plurality of resources.

In some embodiments, the foregoing configuration item b may be configured in a configuration field of the scheduled cell. In this case, the foregoing DCI capable of simultaneously scheduling a plurality of resources may be configured to in the configuration field of the scheduling cell.

In some embodiments, in a case that the scheduled cell is configured to support scheduling with the scheduling cell by the DCI capable of simultaneously scheduling a plurality of resources, the target configuration information further includes: a configuration item b1, information that is configured by the scheduled cell and is about a scheduling cell capable of being jointly scheduled with the scheduled cell. In this case, in a case that there are a plurality of scheduling cells for the UE, the UE may use the configuration item b1 to know which of the plurality of scheduling cells is the scheduling cell jointly scheduled with the scheduled cell.

In a case that the target configuration information is used for configuring the foregoing configuration item b, the UE may know a resource corresponding to the scheduling cell, for example, a resource capable of being scheduled by the scheduling cell, according to the target configuration information.

Configuration item c: a scheduling cell being configured to support scheduling by the DCI capable of simultaneously scheduling a plurality of resources, or the scheduling cell being configured to monitor the DCI capable of simultaneously scheduling a plurality of resources.

In some embodiments, the foregoing configuration item c may be configured in a configuration field of the scheduling cell.

In a case that the target configuration information is used for configuring the foregoing configuration item c, the UE may know a resource corresponding to the scheduling cell according to the target configuration information.

In some embodiments, in Implementation 1 provided in the embodiments of the present disclosure, each candidate resource group includes at least two candidate resources. The DCI capable of simultaneously scheduling a plurality of resources may be a candidate resource group used for scheduling two or more resources. A DCI format of the DCI capable of simultaneously scheduling a plurality of resources is different from a DCI format of DCI for scheduling a single resource. In addition, the DCI for scheduling a single resource and a related configuration are kept unchanged. That is, while the DCI capable of simultaneously scheduling a plurality of resources in Implementation 1 are used to simultaneously schedule a plurality of resources, the DCI for scheduling a single resource may be used to schedule a single resource for the UE.

In Implementation 1 above, the N candidate resource groups satisfy any one of the following examples 11 to 14.

Example 11: In a case that the target configuration information is used for configuring the at least one first resource group (that is, the configuration item a1), the N candidate resource groups are the at least one first resource group. In this case, the N candidate resource groups are determined based on the foregoing configuration item a1.

Example 12: In a case that the target configuration information is used for configuring the at least one second resource group (that is, the configuration item a2), the each candidate resource group in the N candidate resource groups includes a resource group formed by a resource in one second resource group and the first resource (that is, a self-scheduled resource configured by the scheduling cell). In this case, the N candidate resource groups are determined based on the foregoing configuration item a2.

Example 13: In a case that the scheduled cell is configured to support scheduling with the scheduling cell by the DCI capable of simultaneously scheduling a plurality of resources (that is, the configuration item b), the N candidate resource groups include a resource group formed by a resource corresponding to the scheduling cell and a resource corresponding to the scheduled cell, and/or a resource group formed by a resource corresponding to the scheduled cell.

In some embodiments, when the N candidate resource groups include "a resource group formed by a resource corresponding to the scheduling cell and a resource corresponding to the scheduled cell", the N candidate resource groups are determined based on the configuration item b. In some embodiments, when the N candidate resource groups include "a resource group formed by a resource corresponding to the scheduling cell and a resource corresponding to the scheduled cell and a resource group formed by a resource corresponding to the scheduled cell", the N candidate resource groups are determined based on the configuration item b and the configuration item b1.

Example 14: In a case that the scheduling cell is configured to support scheduling by the DCI capable of simultaneously scheduling a plurality of resources, or the scheduling cell is configured to monitor the DCI (that is, the configuration item c) capable of simultaneously scheduling a plurality of resources, the N candidate resource groups include a resource corresponding to the scheduling cell and a resource corresponding to the scheduled cell. In this case, the N candidate resource groups are determined based on the foregoing configuration item c.

In some embodiments, in Implementation 2 provided in the embodiments of the present disclosure, one candidate resource group includes at least two candidate resources or one candidate resource group includes one candidate resource. The DCI capable of simultaneously scheduling a plurality of resources may be used to schedule a single resource or may be used to schedule a candidate resource group including two or more resources. The DCI format of the DCI capable of simultaneously scheduling a plurality of resources is the same as or different from the DCI format of the DCI for scheduling a single resource.

In Implementation 2 above, the N candidate resource groups satisfy any one of the following examples 21 to 24.

Example 21: In a case that the target configuration information is used for configuring the at least one first resource group (that is, the configuration item a1), the N candidate resource groups include the at least one first resource group and/or a resource group formed by the first resource. In this case, the N candidate resource groups are determined based on the foregoing configuration item a1. For example, the N candidate resource groups include the at least one first resource group and a resource group formed by the first resource.

Example 12: In a case that the target configuration information is used for configuring the at least one second resource group (that is, the configuration item a2), each candidate resource group in the N candidate resource groups includes the at least one second resource group, a resource group formed by the first resource, and/or a resource group formed by a resource in each second resource group and the first resource. In this case, the N candidate resource groups are determined based on the foregoing configuration item a2.

Example 23: In a case that the scheduled cell is configured to support scheduling with the scheduling cell by the DCI capable of simultaneously scheduling a plurality of resources (that is, the configuration item b), the N candidate resource groups include a resource group formed by the first resource, a resource group formed by a resource corresponding to the scheduling cell and a resource corresponding to the scheduled cell, and/or a resource group formed by a resource corresponding to the scheduled cell.

When the N candidate resource groups include "a resource group formed by the first resource and a resource group formed by a resource corresponding to the scheduling cell and a resource corresponding to the scheduled cell", the N candidate resource groups are determined based on the configuration item b. In some embodiments, when the N candidate resource groups include "a resource group formed by the first resource, a resource group formed by a resource corresponding to the scheduling cell and a resource corresponding to the scheduled cell, and/or a resource group formed by a resource corresponding to the scheduled cell", the N candidate resource groups are determined based on the configuration item b and the configuration item b1.

Example 24: In a case that the scheduling cell is configured to support scheduling by the DCI capable of simultaneously scheduling a plurality of resources, or the scheduling cell is configured to monitor the DCI capable of simultaneously scheduling a plurality of resources (that is, the configuration item c), the N candidate resource groups include a resource group formed by the first resource, a resource group formed by a resource corresponding to the scheduling cell and a resource corresponding to the scheduled cell, and/or a resource group formed by a resource corresponding to the scheduled cell. In this case, the N candidate resource groups are determined based on the foregoing configuration item c.

Step 202: The UE performs a PDCCH blind detection in search spaces corresponding to the N candidate resource groups according to the target configuration information to obtain first DCI.

It may be understood that the first DCI is one piece of DCI capable of simultaneously scheduling a plurality of resources.

After performing the blind detection to obtain the first DCI, the UE may parse the first DCI to know the resource (the following target resource) actually scheduled by the first DCI.

Figure 3:
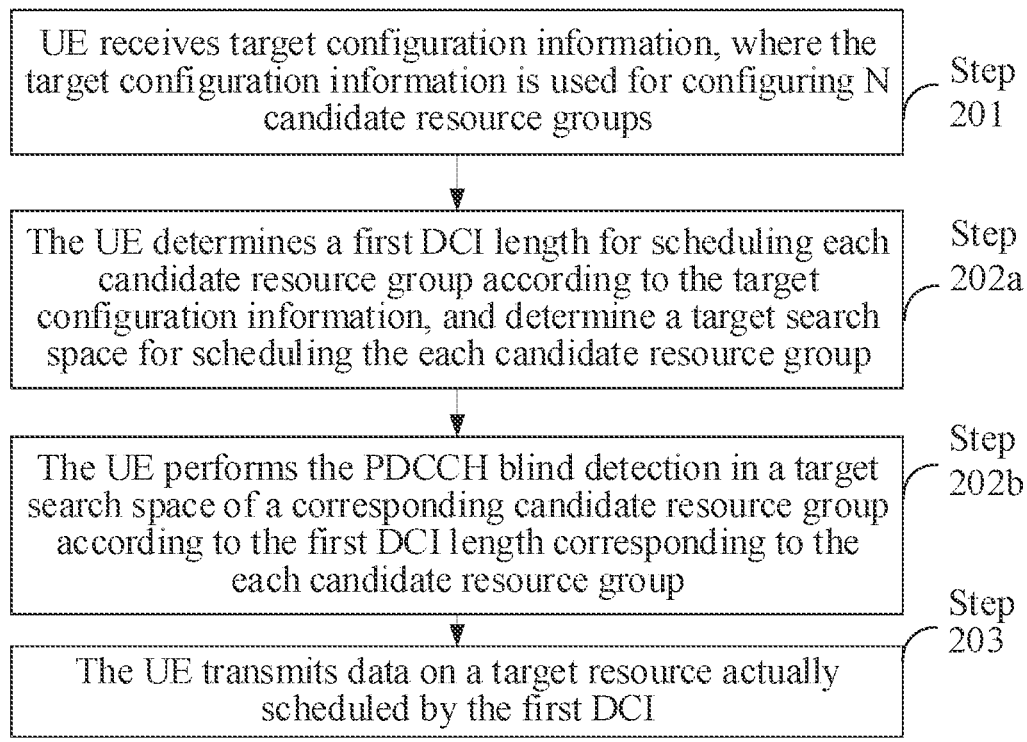
FIG. 3 is a schematic flowchart 2 of a resource scheduling method according to an embodiment of the present disclosure.

In some embodiments, with reference to FIG. 2, as shown in FIG. 3, in the embodiments of the present disclosure, the foregoing step 202 may be implemented by using step 202a and step 202b.

Step 202a: The UE determines a first DCI length for scheduling each candidate resource group according to the target configuration information, and determine a target search space for scheduling the each candidate resource group.

where the search spaces corresponding to the N candidate resource groups include target search spaces of all candidate resource groups.

Step 202b: The UE performs the PDCCH blind detection in a target search space of a corresponding candidate resource group according to the first DCI length corresponding to the each candidate resource group.

It needs to be noted that, in the embodiments of the present disclosure, a DCI length refers to a DCI size, that is, a sum of values of bits occupied by DCI fields of corresponding DCI.

In some embodiments, in the embodiments of the present disclosure, the target search space includes at least one of the following: a search space time-frequency monitoring position or a CCE. One target search control may be represented by a corresponding search space time-frequency monitoring position and/or a CCE.

It may be understood that in the embodiments of the present disclosure, one CCE is a search space for scheduling one candidate resource, that is, a CCE of a PDCCH (or referred to as a candidate PDCCH) carried by the DCI for scheduling the candidate resource.

Similarly, for the related description of one search space time-frequency monitoring position and one search space, reference may be made to the related description of the CCE and one search space. Details are not described herein again.

It needs to be noted that, in the embodiments of the present disclosure, a CCE of a PDCCH search space of each resource may be determined according to the search space function shown in Formula (1) above. This is not described in detail in the embodiments of the present disclosure.

In some embodiments, in the embodiments of the present disclosure, the target configuration information includes N pieces of first configuration information, and one piece of first configuration information corresponds to one candidate resource group.

In some embodiments, the first configuration information corresponding to one candidate resource group may be a frequency or a scheduling mode (for example, supporting cross-carrier scheduling or supporting self-scheduling) of a candidate resource in the candidate resource group to include a size of a BWP or the like.

In some embodiments, the first configuration information corresponding to one candidate resource group may be configuration information of a serving cell corresponding to each candidate resource in the candidate resource group. The configuration information of one serving cell may include a bandwidth frequency supported by the serving cell, a resource scheduling mode of the serving cell, a size of a BWP corresponding to the serving cell, and the like.

In some embodiments, in the resource scheduling method provided in the embodiments of the present disclosure, in Implementation 1, the "determining a first DCI length for scheduling each candidate resource group according to the target configuration information" in the foregoing step 202a may be implemented by using step 202a-1 and step 202a-2.

Step 202a-1: The UE determines, according to each piece of first configuration information and field information of at least one DC field, a first field length (that is, a field size) of each DCI field corresponding to a candidate resource group of the each first configuration information.

In some embodiments, the field information of the at least one DCI field may be configured in the target configuration information, preconfigured in a protocol or acquired by the UE from the network device in advance. This is not specifically limited in the embodiments of the present disclosure.

For example, the field information of one DCI field may be information such as a field name or identifier of the DCI field. Different field information may be used to differentiate between different DCI fields.

It may be understood that the foregoing at least one DCI field may be a DCI field forming the DCI capable of simultaneously scheduling a plurality of resources in Implementation 1 or a DCI field forming the DCI capable of simultaneously scheduling a plurality of resources in Implementation 2.

Step 202a-2: The UE determines the first DCI length of the each candidate resource group according to the first field length of the each DCI field.

It needs to be noted that, the DCI length of one piece of DCI may be a sum of field lengths (for example, first field lengths) of all DCI fields in the DCI.

In some embodiments, in Implementation 1 above, the foregoing step 202a-2 may be implemented by using step 1-1 and step 1-2.

Step 1-1: The UE determines an initial DCI length of the each candidate resource group according to the first field length of the each DCI field.

It may be understood that the initial DCI length of one candidate resource group may be a sum of field lengths of DCI fields corresponding to the candidate resource group calculated by the UE.

Step 1-2: The UE uses a second DCI length as the first DCI length of the each candidate resource group.

The second DCI length is an initial DCI length of a candidate resource group with the largest initial DCI length in the N candidate resource groups.

In some embodiments, referring to step 1-2, in the resource scheduling method in the embodiments of the present disclosure, N candidate resource groups may be grouped into a plurality of first sets, and the first DCI length of each candidate resource group in each first set is a DCI length of a corresponding first set. The DCI length corresponding to one first set is the second DCI length is an initial DCI length of a candidate resource group with the largest initial DCI length in all the candidate resource groups in the first set.

In some embodiments, in Implementation 1 above, the foregoing step 202a-2 may be implemented by using step 2-1 to step 2-3.

Step 2-1: The UE determines a target field length of the each DCI field according to the first field length of the each DCI field.

A target field length of any DCI field is a first field length being the largest field length in the first field length of the any DCI field in the N candidate resource groups.

Step 2-2: The UE determines a third DCI length according to the target field length of the each DCI field.

The third DCI length is a sum of target field lengths of the DCI fields.

Step 2-3: The UE uses the third DCI length as the first DCI length of the each candidate resource group.

In some embodiments, referring to step 2-1 to step 2-3, in the resource scheduling method in the embodiments of the present disclosure, N candidate resource groups may be grouped into a plurality of second sets, and the first DCI length of each candidate resource group in each second set is a DCI length of a corresponding second set. The UE may determine the target field length of the each DCI field in each second set according to the first field length of the each DCI field; and determine the DCI length corresponding to a corresponding second set according to the target field length of the each DCI field in each second set, where the target field length of any DCI field in the each second set is a first field length being the largest field length in the first field length of the any DCI field in the corresponding second set. The DCI length corresponding to the second set is a sum of target field lengths of each DCI field in the corresponding second set.

In some embodiments, in the embodiments of the present disclosure, in a process of determining the first DCI length of the each candidate resource group, the UE may determine whether the first DCI length of the each candidate resource group includes a target field and a field length of the target field, that is, determine whether the DCI length of the first DCI includes a target field and a field length of the target field.

The target field is a DCI field used for indicating the N candidate resource groups. For example, the target field is an ID indication field of a candidate resource group (or a candidate resource).

Manner 1: In a case that N is 1, the first DCI (that is, the foregoing DCI capable of simultaneously scheduling a plurality of resources) does not include a target field. The first DCI does not include the ID indication field of the candidate resource group.

Manner 2: In a case that N is greater than 1, a field length of the target field is a value obtained by rounding up log 2(N), that is, a quantity of bits represented by the value.

For example, in a case that N is equal to 4, a field length of the target field is a value obtained by rounding up log 2(4), that is, 2. That is, the field length of the target field is two bits.

Manner 3: In a case that N is greater than 1, a field length of the target field is a preset value, that is, a quantity of bits represented by the preset value. The foregoing preset value is a fixed value (for example, a fixed value specified in a protocol) or configured through RRC.

A manner of determining the field length of the target field in Manner 2 and Manner 3 above is a parallel manner.

In some embodiments, with reference to the foregoing step 2-1 to step 2-3 and the target fields described in Manner 1 to Manner 3 above, the field length of each DCI field that may be determined by the UE includes the field length of the foregoing target field. In addition, the field length and field position of another field different from the target field in the DCI length of the first DCI are interpreted according to the information of the target field.

In some embodiments, with reference to Implementation 1 above, "the UE determines a first DCI length for scheduling each candidate resource group according to the target configuration information, and determine a target search space for scheduling the each candidate resource group" in step 202a may be determined by using any one of the following step 3-1 to step 3-3.

Step 3-1: The UE determines the target search space for scheduling the each candidate resource group according to first information.

The first information is indication information used for indicating the N candidate resource groups or at least one predefined value (for example, one predefined value is 0); indication information of the each candidate resource group corresponds to one search space; and each predefined value corresponds to one search space, and the each predefined value corresponds to at least one candidate resource group.

For example, the first information may be ID indication information of the N candidate resource groups. That is, the first information is a content in the target field.

In some embodiments, the first information includes at least one of the following: an identifier of each candidate resource group, a preset identifier, or an identifier (ID) configured in a radio resource control RRC message.

In some embodiments, an identifier of one candidate resource group includes at least one of the following: identification information ID configured for the one candidate resource group, an identifier of one candidate resource in the one candidate resource group, or an identifier and a target bit of one candidate resource in the one candidate resource group, where one target bit is used for indicating whether the corresponding candidate resource group includes a plurality of candidate resources.

For example, the identifier (that is, the indication ID) of one candidate resource may be a CIF corresponding to the candidate resource, that is, a CIF of a serving cell corresponding to the candidate resource.

In some embodiments, the identifier of one candidate resource group may be an identifier of a candidate resource in the candidate resource group. The candidate resource is any one of the following in the candidate resource group: a scheduled resource (that is, a resource self-scheduled by the scheduling cell), a resource on a serving cell different from the scheduling cell, a resource corresponding to a primary cell, a resource corresponding to a secondary cell, a candidate resource with the smallest DCI length in the candidate resource group, and a candidate resource with the largest DCI length in the candidate resource group. That is, the identifier of a resource in the candidate resource group is reused for one candidate resource group.

It may be understood that in a case that the first information is a preset identifier or an identifier configured in an RCC message, the target search space for scheduling the each candidate resource group is related to the preset identifier or the identifier configured in an RCC message. That is, each candidate resource group shares one search space.

In a case that the first information is a CIF corresponding to a resource in the candidate resource group, the target search space for scheduling the each candidate resource group is related to the CIF corresponding to the resource in the corresponding candidate resource group.

In some embodiments, in a case that the first information is at least one predefined value, the target search space for scheduling the each candidate resource group is a search space corresponding to a corresponding predefined value.

Step 3-2: The UE uses a first search space of the each candidate resource group as the target search space for scheduling the corresponding candidate resource group.

A first search space of any candidate resource group is a search space of one candidate resource in the any candidate resource group. A search space of the one candidate resource is a search space when the one candidate resource is separately scheduled.

The foregoing "search space of one candidate resource in the any candidate resource group" is a search space of a candidate resource in the any candidate resource group. In the embodiments of the present disclosure, for the description of a cell in the any candidate resource group, reference may be made to the related description of a candidate resource in one candidate resource group in the foregoing step 3-2. Details are not described herein again.

Step 3-3: The UE uses a target search space set as the target search space for scheduling the each candidate resource group.

The target search space set includes first search spaces of all the candidate resource groups.

In some embodiments, in Implementation 2 provided in the embodiments of the present disclosure, the N candidate resource groups include at least one group. In some embodiments, the foregoing step 202a may be implemented by using step 4-1.

Step 4-1: The UE determines a first DCI length for scheduling a candidate resource group in each group according to the target configuration information, and determine a target search space for scheduling the candidate resource group in the each group.

The first DCI in all candidate resource groups in one group has the same length, and target search spaces of all the candidate resource groups in the one group are the same.

In some embodiments, in the embodiments of the present disclosure, for the description of the first DCI length for scheduling the candidate resource group in the each group in step 4-1, reference may be made to the related description of the first DCI length for scheduling a candidate resource group in the each group in Implementation 1 above. Details are not described herein again.

In some embodiments, the at least one group is obtained through division based on a first candidate resource or at least one second candidate resource, where the first candidate resource is one candidate resource self-scheduled by the scheduling cell, and one second candidate resource is one candidate resource cross-carrier scheduled by the scheduling cell.

The at least one group is obtained through division based on a first candidate resource in a scenario 1, and the at least one group is obtained through division based on at least one second candidate resource in a scenario 2.

For example, the scheduling cell is a Pcell, and the first candidate resource is a candidate resource self-scheduled by the Pcell. A resource corresponding to an Scell 1 cross-carrier scheduled by the Pcell is a second candidate resource.

In some embodiments, the N candidate resource groups include a first group and a second group.

It may be understood that one candidate resource group may belong to a plurality of different groups.

In the scenario 1, the at least one group is obtained through division based on the first candidate resource, and each first group includes a candidate resource group including the first candidate resource; and each second group includes a candidate resource group formed by the one second candidate resource.

For example, the first group may include a resource group (denoted as a resource group 1) formed by a first candidate resource corresponding to the Pcell and a resource group (denoted as a resource group 2) formed by a first candidate resource corresponding to the Pcell and a second candidate resource corresponding to the Scell 1. One second group includes a resource group (denoted as a resource group 3) formed by a second candidate resource corresponding to the Scell 1.

In the scenario 2, if the at least one group is obtained through division based on the at least one second candidate resource, candidate resource groups included in the each first group all include one same second candidate resource; and the each second group includes a candidate resource group formed by the first candidate resource.

For example, one first group includes a resource group (denoted as a resource group 4) formed by a second candidate resource corresponding to the Scell 1 and a resource group (denoted as a resource group 5) formed by a first candidate resource corresponding to the Pcell and a second candidate resource corresponding to the Scell 1. The second group may include a resource group (denoted as a resource group 6) formed by a first candidate resource corresponding to the Pcell.

In some embodiments, in the foregoing step 4-1, a first DCI length of the each candidate resource group in any first group is a first DCI length of a candidate resource group with the largest first DCI length in the any first group. A first DCI length of a candidate resource group in any second group is a first DCI length when a candidate resource in the candidate resource group in the any second group is separately scheduled.

For example, with reference to the example of the foregoing Scenario 1, a first DCI length of a resource group 1 and a first DCI length of a resource group 2 in the first group are both a first DCI length of a resource group with the largest first DCI length in the two resource groups.

In some embodiments, for the foregoing step 4-1, in the scenario 1, if the at least one group is obtained through division based on the first candidate resource, a target search space of the candidate resource group in the each first group is a search space when the first candidate resource is separately scheduled; and a target search space of the candidate resource group in the any second group is a search space when a second candidate resource in the candidate resource group in the any second group is separately scheduled.

For example, with reference to the example of the foregoing Scenario 1, a target search space of the resource group 1 and a target search space of the resource group 2 in the first group are both a search space of a first candidate resource corresponding to the Pcell, that is, a search space when the Pcell is separately scheduled. A target search space of the resource group 3 in the second group is a search space of the second candidate resource corresponding to the Scell 1, that is, a search space when the Scell 1 is separately scheduled.

For the foregoing step 4-1, in the scenario 2, if the at least one group is obtained through division based on the at least one second candidate resource, a target search space of a candidate resource group in the any first group is a search space when a second candidate resource in a candidate resource group in the any first group is separately scheduled; and a target search space of the candidate resource group in the any second group is a search space when the candidate resource in the candidate resource group in the any second group is separately scheduled.

For example, with reference to the example of the foregoing Scenario 2, a target search space of the resource group 4 and a target search space of the resource group 5 in the first group are both a search space of a second candidate resource corresponding to the Scell 1, that is, a search space when the Scell 1 is separately scheduled. A target search space of the resource group 6 in the second group is a search space of the second candidate resource corresponding to the Pcell, that is, a search space when the Pcell is separately scheduled.

Further, in some embodiments, after the foregoing step 202 and before step 203, the UE may calculate whether the serving cells for the UE satisfy the DCI length budget.

The DCI length budget may be a DCI size budget, that is, a DCI length quantity budget.

In some embodiments, the first DCI length of the each candidate resource group is associated with at least one serving cell, or the first DCI length of the each candidate resource group is associated with at least one serving cell group, where each serving cell corresponds to one DCI length budget, and each serving cell group corresponds to one DCI length budget.

In a scenario 3, the first DCI length of the each candidate resource group is associated with at least one serving cell. In this case, the first DCI length of one candidate resource is used as a DCI length budget of one or more serving cells.

In some embodiments, a serving cell associated with one candidate resource group may be included in serving cells corresponding to candidate resources in a corresponding candidate resource group.

In a scenario 4, the first DCI length of the each candidate resource group is associated with at least one serving cell group. In this case, the first DCI length of one candidate resource is used as a DCI length budget of one or more serving cell groups jointly formed by serving cells.

In some embodiments, a serving cell group associated with one candidate resource group may be a serving cell group formed by serving cells corresponding to candidate resources in a corresponding candidate resource group.

In some embodiments, the DCI length budget corresponding to the each serving cell group is obtained based on the DCI length budget of the each serving cell in the corresponding serving cell group.

In some embodiments, in the embodiments of the present disclosure, a plurality of limitations for a DCI length budget for scheduling a serving cell may be introduced. That is, for a scheduling cell set $\{C1, C2 \ldots, Ck\}$ (k=1, 2, . . . , and M is a quantity of cells), any DCI length budget for scheduling a subset of the cell set is $S \leq K \times S0$, where S0 is a limitation of a DCI length budget for scheduling a single serving cell.

For example, one serving cell group includes the foregoing serving cells C1 and C2, and a DCI length budget of the serving cell group is less than or equal to $2 \times S0$.

In some embodiments, in the scenario 3 in the embodiments of the present disclosure, a first DCI length of a first candidate resource group is associated with a first serving cell. After the "determining a first DCI length for scheduling each candidate resource group" in the foregoing embodiments, the resource scheduling method provided in the embodiments of the present disclosure may further include step 301.

Step 301: The UE determines, according to the first DCI length of the first candidate resource group, whether the first serving cell satisfies a DCI length budget of the first serving cell.

The first candidate resource group is at least one of the N candidate resource groups.

It may be understood that a DCI length budget for one serving cell is a quantity of different DCI formats corresponding to first DCI lengths of corresponding candidate resource groups.

It may be understood that for one first serving cell, if the quantity of different DCI formats corresponding to first DCI lengths of corresponding candidate resource groups is less than the DCI length budget (that is, one value) of the first serving cell, the first serving cell satisfies the DCI length budget of the first serving cell.

In some embodiments, in the scenario 4 in the embodiments of the present disclosure, a first DCI length of a first candidate resource group is associated with a first serving cell group. After the "determining a first DCI length for scheduling each candidate resource group" in the foregoing embodiments, the method further includes step 302.

Step 302: The UE determines, according to the first DCI length of the first candidate resource group, whether the first serving cell group satisfies a DCI length budget of the first serving cell group.

It may be understood that for one first serving cell group, if the quantity of different DCI formats corresponding to first DCI lengths of corresponding candidate resource groups is less than the DCI length budget (that is, one value) of the first serving cell group, the first serving cell group satisfies the DCI length budget of the first serving cell group.

Step 203: The UE transmits data on a target resource actually scheduled by the first DCI.

The target resource includes a candidate resource in one candidate resource group in the N candidate resource groups.

In some embodiments, the foregoing target resource may be an uplink resource and/or a downlink resource. That is, the data transmitted by the UE on the target resource actually scheduled by the first DCI includes at least one of uplink data or downlink data. That is, the UE may send data and/or receive data on the target resource.

In some embodiments, the UE transmits data on at least two serving cells corresponding to the target resource actually scheduled by the first DCI. The at least two serving cells may include one normal UL cell and SUL cell of the UE.

In the embodiments of the present disclosure, the resource scheduling method provided in the embodiments of the present disclosure is described by using an example in which the resource scheduled for the UE is determined based on a serving cell corresponding to the resource scheduled for the UE.

Embodiments of the Present Disclosure Provide
Embodiment 1

With reference to Implementation 1 above, it is assumed that the first DCI (that is, the DCI capable of simultaneously scheduling a plurality of resources) only schedules a candidate scheduling serving cell group including two (or more) serving cells. In this case, the first DCI and DCI for scheduling a single serving cell have different formats. In addition, configuration information and DCI for scheduling a single serving cell are kept unchanged. Description is provided below by using an example in which the DCI capable of simultaneously scheduling a plurality of resources is first DCI.

For example, it is assumed that four serving cells configured for the UE (for example, configured for the UE through the target configuration information) include a Pcell, an Scell 1, an Scell 2, and an Scell 3. In addition, the Pcell is configured to be self-scheduled. The Scell 1, the Scell 2, and the Scell 3 are all configured to be cross-carrier scheduled by the Pcell, and the configured carrier indication IDs (for example, CIFs) are respectively 1, 2, and 3. A parameter configuration is performed in a search space on a scheduling serving cell (for example, the Pcell). Candidate PDCCHs for scheduling the Pcell, the Scell 1, the Scell 2, and the Scell 3 are respectively obtained according to a candidate PDCCH calculation formula (that is, the foregoing Formula (1) related to the CIF). The UE obtains, according to configurations of the serving cells, DCI lengths of DCI 0_1 and DCI 1_1 for scheduling the serving cells. For the scheduling of single serving cell, after obtaining a candidate PDCCH, the UE separately performs a PDCCH blind detection on a DCI length of a corresponding candidate serving cell group, and a serving cell scheduled by the DCI is determined on detected DCI through a CIF field. In addition, the first DCI such as DCI 0_3 or DCI 1_3 is configured and monitored in the search space of the scheduling cell (for example, the Pcell). DCI 0_3 and DCI 1_3 only perform simultaneous scheduling on two (or more than two) serving cells.

In the first step, the UE receives serving cell configuration information, and determines a candidate scheduling serving cell group capable of being scheduled by the first DCI.

The candidate scheduling serving cell group includes two (or more than two) serving cells.

In some embodiments, the foregoing serving cell configuration information may correspond to the foregoing target configuration information, and the candidate scheduling serving cell group may correspond to the foregoing N candidate resource groups.

Additional configuration information of scheduling a plurality of serving cells by one same piece of DCI (for example, the first DCI in the first step) may include at least one of the following:

1) The scheduling cell configures a) a serving cell group or b) a serving cell group list capable of being scheduled by the first DCI.

The information in 1) above corresponds to the configuration item a1 in the foregoing embodiments.

2) The scheduling cell is configured to be self-scheduled and configures a) a cross-carrier scheduled serving cell group or b) a cross-carrier scheduled serving cell group list capable of being simultaneously scheduled by the first DCI with the scheduling cell.

The information in 2) above corresponds to the configuration item a2 in the foregoing embodiments.

3) The scheduled cell is configured to support scheduling using the first DCI of the scheduling cell.

The information in 3) above corresponds to the configuration item b in the foregoing embodiments.

4) The scheduling cell is configured to support scheduling using the first DCI.

The information in 4) above corresponds to the configuration item c in the foregoing embodiments.

Corresponding to Example 11 in the foregoing embodiments, for the information in 1) in the first step, when the scheduling serving cell configures a serving cell group or a serving cell group list capable of being scheduled by the first DCI, the configured serving cell group or serving cell group list is the candidate scheduling serving cell group capable of being scheduled by the first DCI. In this case, two (or more than two) serving cells are included in one serving cell group.

For example, a serving cell group list, for example, (Pcell+Scell 1), (Pcell+Scell 2), (Pcell+Scell 3), and (Scell 1+Scell 2), is configured on the scheduling cell (for example, the Pcell). In this case, DCI 0_3 and DCI 1_3 have the foregoing four candidate scheduling serving cell groups. The first DCI is DCI 0_3 or DCI 1_3.

Corresponding to Example 12 in the foregoing embodiments, for the information in 2) in the first step, when the scheduling serving cell configures a cross-carrier scheduled serving cell group or a cross-carrier serving cell group list capable of being simultaneously scheduled by the first DCI with the scheduling cell, the scheduling serving cell and the configured cross-carrier scheduled serving cell group or cross-carrier serving cell group list is the candidate scheduling serving cell group scheduled by the first DCI. In this case, one (or more than one) cross-carrier serving cell is included in one serving cell group.

For example, a cross-carrier serving cell group list, for example, (Scell 1) and (Scell 2), is configured on the scheduling serving cell (i.e., the Pcell). In this case, DCI 0_3 and DCI 1_3 have a total of two candidate scheduling serving cell groups (Pcell+Scell 1) and (Pcell+Scell 2). The foregoing first DCI is DCI 0_3 or DCI 1_3.

Corresponding to Example 13 in the foregoing embodiments, for the information in 3) in the first step, when the scheduled cell is configured to support simultaneous scheduling by one piece of DCI with the scheduling cell (that is, support scheduling using the first DCI), the scheduling serving cell and scheduled serving cells configured to support simultaneous scheduling by one same piece of DCI form candidate scheduling serving cell groups scheduled by the first DCI.

For example, the scheduled serving cells Scell 1 and Scell 2 are both configured to support simultaneous scheduling by one piece of DCI with the scheduling cell (that is, support scheduling using the first DCI). That is, DCI 0_3 and DCI 1_3 have a total of two candidate scheduling serving cell groups (Pcell+Scell 1) and (Pcell+Scell 2). In this case, the first DCI is DCI 0_3 and DCI 1_3.

In some embodiments, corresponding to Example 13 in the foregoing embodiments, for the information in 3) in the first step, when the scheduled cell is configured to support simultaneous scheduling by one piece of DCI (that is, support scheduling using the first DCI), a specific combination of these scheduled cells is a candidate scheduling serving cell group scheduled by the first DCI, for example, a combination of any two scheduled cells.

For example, the scheduled serving cells Pcell, Scell 1, and Scell 2 are all configured to support simultaneous scheduling by one piece of DCI (that is, support scheduling using the first DCI). That is, DCI 0_3 and DCI 1_3 have a total of three candidate scheduling serving cell groups (Pcell+Scell 1), (Pcell+Scell 2), and (Scell 1+Scell 2). In this case, the first DCI is DCI 0_3 and DCI 1_3.

Corresponding to Example 14 in the foregoing embodiments, for the information in 4) in the first step, when the scheduling cell is configured to support simultaneous scheduling by one same piece of DCI with the cross-carrier scheduling cell (that is, support scheduling using the first DCI), the scheduling cell and configured scheduled cross-carrier serving cells of the cell form candidate scheduling serving cell groups scheduled by the first DCI.

For example, the scheduling cell Pcell is configured to support scheduling by one same piece of DCI, DCI 0_3 and DCI 1_3 have a total of three candidate scheduling serving cell groups (Pcell+Scell 1), (Pcell+Scell 2), and (Pcell+Scell 3). In this case, the first DCI is DCI 0_3 and DCI 1_3.

In the second step, the UE may determine a field length of a DCI field (that is, the foregoing target field) of an ID of a scheduling serving cell (for example, the candidate scheduling serving cell) indicated in the first DCI, including at least one of the following:

1) Corresponding to Manner 1 in the foregoing embodiments, when one candidate scheduling serving cell group is determined, the first DCI does not include an ID indication field.
2) Corresponding to Manner 2 in the foregoing embodiments, when a quantity of determined candidate scheduling serving cell groups is N (N>1), the first DCI includes an ID indication field indicated by bits whose quantity is obtained by rounding up log 2(N).
3) Corresponding to Manner 3 in the foregoing embodiments, when a quantity of determined candidate scheduling serving cell groups is N (N>1), the first DCI includes an ID indication field indicated by M bits, where M has a fixed value or configured through RRC.

For example, when it is determined that there are a total of four candidate scheduling serving cell groups (Pcell+Scell 1), (Pcell+Scell 2), (Pcell+Scell 3), and (Scell 1+Scell 2), two bits in DCI 0_3 and DCI 1_3 indicate an ID indication field of serving cell groups capable of being scheduled.

Corresponding to the related description of the identifier of the candidate resource group in the first information in the foregoing embodiments, in a case that the UE performs the foregoing first step, when the ID indication field of serving cell groups capable of being scheduled exists in the first DCI, the UE may determine an indication ID of each candidate scheduling serving cell group in the first DCI, including at least one of the following:

1) ID correspondingly configured for a candidate scheduling serving cell group
   a) For example, when four serving cell lists (Pcell+Scell 1), (Pcell+Scell 2), (Pcell+Scell 3), and (Scell 1+Scell 2) are configured, IDs 0, 1, 2, and 3 are assigned to indicate corresponding candidate scheduling serving cell groups.
2) An indication ID (for example, a CIF) of a specific serving cell in a candidate scheduling serving cell group is reused.
   a) For example, when determined candidate scheduling serving cell groups are (Pcell+Scell 1) and (Pcell+Scell 2), CIF values 1 and 2 of the Scell 1 and the Scell 2 are reused to indicate (Pcell+Scell 1) and (Pcell+Scell 2).

In the third step, corresponding to the related steps of implementing step 202a in Implementation 1 above, the UE may determine a DCI length (that is, the first DCI length) for scheduling each candidate scheduling serving cell group, including at least one of the following:

1) A size of each DCI field is determined according to a configuration of each cell in a candidate scheduling serving cell group, the determined field length of a serving cell group indication field (that is, the target field) in the DCI is combined to calculate a DCI size corresponding to each candidate scheduling serving cell group, and the DCI size is determined as the DCI length for scheduling the each candidate scheduling serving cell group.
   a) For example, assuming that the determined candidate scheduling serving cell groups are (Pcell+Scell 1) and (Pcell+Scell 2), it is calculated that DCI lengths for scheduling the candidate scheduling serving cell groups are respectively DCI 1=50 and DCI 2=55.
2) A size of each DCI field is determined according to a configuration of each cell in a candidate scheduling serving cell group, the determined size of a serving cell group indication field in the DCI is combined to calculate DCI lengths corresponding to the candidate scheduling serving cell groups, the largest DCI length is used as a DCI length of the candidate scheduling serving cell groups, and the size and position of another field different from the indication of the candidate scheduling serving cell group are interpreted according to the candidate scheduling serving cell group in the DCI. For example, in the example in 1), the finally determined unique DCI length is 55.

In some embodiments, the UE groups a plurality of candidate scheduling serving cell groups into a plurality of sets, and in each set, a DCI length of a candidate scheduling serving cell group in the each set is determined according to a maximum DCI length.

In addition, the UE may use at least one method below to determine whether the DCI length budget of each serving cell is satisfied:
1) Corresponding to Scenario 3 in the foregoing embodiments, when the DCI length budget is only limited according to each scheduled serving cell, a DCI size of each candidate scheduling serving cell group is used as a DCI length of each serving cell or used as a DCI length of a specific serving cell (the Pcell or the Scell or a serving cell with the smallest DCI length quantity in the candidate scheduling serving cell group) to determine whether the DCI length budget is satisfied.
2) Corresponding to Scenario 3 in the foregoing embodiments, a plurality of limitations for a DCI length budget for scheduling a serving cell may be introduced. That is, for a scheduling cell set {C1, C2 . . . , Ck} (k=1, 2, . . . , and M is a quantity of cells), any DCI length quantity for scheduling a subset of the cell set is S<=K×S0, where S0 is a limitation of a DCI length budget for scheduling a single cell. In this case, the DCI length of each candidate scheduling serving cell group is only used as a DCI length for scheduling a candidate scheduling serving cell group.

In the fourth step, corresponding to the related steps of implementing step 202a in Implementation 1 above, the UE may determine a candidate PDCCH search space (that is, the foregoing target search space) for scheduling each candidate scheduling serving cell group, including at least one of the following:
1) Corresponding to the case in which the first information is a CIF corresponding to a specific resource in the candidate resource group in the foregoing step 3-1, the calculation of the candidate PDCCH search space of each candidate scheduling serving cell group is related to an ID indication field of corresponding first DCI, that is, related to an indication ID (for example, a CIF) in an ID indication field of the first DCI.
2) Corresponding to the foregoing step 3-2, the calculation of the candidate PDCCH search space of each candidate scheduling serving cell group is related to a CIF of a specific cell (a Pcell or an Scell) in the serving cell group or reuses a candidate PDCCH search space when a specific serving cell in the candidate scheduling serving cell group schedules a single cell.
3) Corresponding to the foregoing step 3-3, the calculation of the candidate PDCCH search space of each candidate scheduling serving cell group reuses a set of candidate PDCCH search spaces when all serving cells in the candidate scheduling serving cell group schedule a single cell.
4) Corresponding to the case in which the first information is a preset identifier or an identifier configured in an RCC message in the foregoing step 3-1, the calculation of the candidate PDCCH search space of each candidate scheduling serving cell group is related to the same ID predefined or configured through RRC. That is, all candidate scheduling serving cell groups share one same candidate PDCCH search space.

Finally, when performing a PDCCH blind detection on the determined corresponding DCI length in a PDCCH search space corresponding to each determined candidate scheduling serving cell group, the UE sends and receives data according to the received DCI. When the quantity of the determined candidate scheduling serving cell groups is greater than 1, actually scheduled serving cells are indicated and determined according to the candidate scheduling serving cell group in the DCI, and data is sent and received in these serving cells (for example, a UL cell or a SUL cell).

It needs to be noted that the steps in Embodiment 1 above do not have a strict sequence, and the sequence of the steps may be changed.

Embodiments of the Present Disclosure Provide
Embodiment 2

With reference to Implementation 2 above, it is assumed that the first DCI (that is, the foregoing DCI capable of simultaneously scheduling a plurality of resources) may schedule a single serving cell or may schedule a candidate scheduling serving cell group including two (or more) serving cells. For example, the first DCI may share the format of the DCI for scheduling a single serving cell or may have a format different from that of the DCI for scheduling a single serving cell. Description is provided below by using an example in which the DCI capable of simultaneously scheduling a plurality of resources is first DCI.

For example, it is assumed that four serving cells configured for the UE (for example, configured through the target configuration information) include a Pcell, an Scell 1, an Scell 2, and an Scell 3. In addition, the Pcell is configured to be self-scheduled. The Scell 1, the Scell 2, and the Scell 3 are all configured to be cross-carrier scheduled by the Pcell, and the configured carrier indication IDs (for example, CIFs) are respectively 1, 2, and 3. A parameter configuration is performed in a search space on a scheduling serving cell (i.e., the Pcell). Candidate PDCCH groups for scheduling the Pcell, the Scell 1, the Scell 2, and the Scell 3 are respectively obtained according to a candidate PDCCH calculation formula (related to the CIF). The UE expands DCI 0_1 and DCI 1_1 to support scheduling of a plurality of serving cells.

In the first step, the UE receives serving cell configuration information, and determines a candidate scheduling serving cell group capable of being scheduled by the first DCI, where the candidate scheduling serving cell group includes one or more serving cells.

In some embodiments, the foregoing serving cell configuration information may correspond to the foregoing target configuration information, and the candidate scheduling serving cell group may correspond to the foregoing N candidate resource groups.

Additional configuration information of scheduling a plurality of serving cells by one same piece of DCI (for example, the first DCI in the first step) may include at least one of the following:
1) The scheduling cell configures a) a serving cell group or b) a serving cell group list capable of being scheduled by the first DCI.

The information in 1) above corresponds to the configuration item a1 in the foregoing embodiments.
2) The scheduling cell is configured to be self-scheduled and configures a) a cross-carrier scheduled serving cell group or b) a cross-carrier scheduled serving cell group list capable of being simultaneously scheduled by the first DCI with the scheduling cell.

The information in 2) above corresponds to the configuration item a2 in the foregoing embodiments.
3) The scheduled cell is configured to support scheduling using the first DCI of the scheduling cell.

The information in 3) above corresponds to the configuration item b in the foregoing embodiments.
4) The scheduling cell is configured to support scheduling using the first DCI.

The information in 4) above corresponds to the configuration item c in the foregoing embodiments.

Corresponding to Example 21 in the foregoing embodiments, for the information in 1) in the first step, when the scheduling serving cell configures a serving cell group or a serving cell group list capable of being scheduled by the first DCI, the configured serving cell group or serving cell group list is the candidate scheduling serving cell group scheduled by the first DCI. In this case, one or two (or more than two) serving cells are included in one serving cell group.

For example, a serving cell group list, for example, (Pcell), (Scell 3), (Pcell+Scell 1), and (Pcell+Scell 2), is configured on the scheduling serving cell (for example, the Pcell). That is, expanded DCI 0_1 and DCI 1_1 have the foregoing four candidate scheduling serving cell groups. The first DCI is DCI 0_3 or DCI 1_3.

Corresponding to Example 22 in the foregoing embodiments, for the information in 2) in the first step, when the scheduling serving cell configures a cross-carrier scheduled serving cell group or a cross-carrier serving cell group list capable of being simultaneously scheduled by the first DCI with the scheduling cell, all serving cells capable of performing single-carrier scheduling, the scheduling serving cell, the configured cross-carrier scheduled serving cell group or cross-carrier serving cell group list is the candidate scheduling serving cell group scheduled by the first DCI. In this case, one (or more than one) cross-carrier serving cell is included in one serving cell group.

For example, a cross-carrier serving cell group list, for example, (Scell 1) and (Scell 2), is configured on the scheduling serving cell (for example, the Pcell). That is, expanded DCI 0_1 and DCI 1_1 have a total of six candidate scheduling serving cell groups (Pcell), (Scell 1), (Scell 2), (Scell 3), (Pcell+Scell 1), and (Pcell+Scell 2). The foregoing first DCI is DCI 0_1 or DCI 1_1.

Corresponding to Example 23 in the foregoing embodiments, for the information in 3) in the first step, when the scheduled cell is configured to support simultaneous scheduling by one piece of DCI with the scheduling cell (that is, support scheduling using the first DCI), all serving cells capable of performing single-carrier scheduling, the scheduling serving cell, and scheduled serving cells configured to support simultaneous scheduling by one same piece of DCI form candidate scheduling serving cell groups scheduled by the first DCI.

For example, the scheduled serving cells Scell 1 and Scell 2 are both configured to support simultaneous scheduling by one piece of DCI with the scheduling cell (that is, support scheduling using the first DCI). That is, expanded DCI 0_1 and DCI 1_1 have a total of six candidate scheduling serving cell groups (Pcell), (Scell 1), (Scell 2), (Scell 3), (Pcell+Scell 1), (Pcell+Scell 2). The first DCI is DCI 0_1 or DCI 1_1.

Corresponding to Example 23 in the foregoing embodiments, for the information in 3) in the first step, when the scheduled cell is configured to support simultaneous scheduling by one piece of DCI (that is, support scheduling using the first DCI), all serving cells capable of performing single-carrier scheduling and a specific combination of these scheduled cells is a candidate scheduling serving cell group scheduled by the first DCI, for example, a combination of any two scheduled cells.

For example, the scheduled serving cells Pcell, Scell 1, and Scell 2 are both configured to support simultaneous scheduling by one piece of DCI (that is, support scheduling using the first DCI). That is, expanded DCI 0_1 and DCI 1_1 have a total of six candidate scheduling serving cell groups (Pcell), (Scell 1), (Scell 2), (Scell 3), (Pcell+Scell 1), (Pcell+Scell 2), and (Scell 1+Scell 2). The first DCI is DCI 0_1 or DCI 1_1.

Corresponding to Example 24 in the foregoing embodiments, for the information in 4) in the first step, when the scheduling cell is configured to support simultaneous scheduling by one same piece of DCI with the cross-carrier scheduling cell (that is, support scheduling using the first DCI), all serving cells capable of performing single-carrier scheduling, the scheduling cell, and configured scheduled cross-carrier serving cells of the cell form candidate scheduling serving cell groups scheduled by the first DCI.

For example, the scheduling cell Pcell is configured to support scheduling by one same piece of DCI, expanded DCI 0_1 and DCI 1_1 have a total of seven candidate scheduling serving cell groups (Pcell), (Scell 1), (Scell 2), (Scell 3), (Pcell+Scell 1), (Pcell+Scell 2), and (Pcell+Scell 3). The first DCI is DCI 0_1 or DCI 1_1.

In some embodiments, some foregoing single serving cells may be configured not to be separately scheduled or not to be separately scheduled according to a limitation rule. For example, an Scell that has been configured to support multi-carrier scheduling is not to be separately scheduled.

In the second step, the UE may determine a field length of a DCI field (that is, the foregoing target field) of an ID of a scheduling serving cell (for example, the candidate scheduling serving cell) indicated in the first DCI, including at least one of the following:

1) Corresponding to Manner 1 in the foregoing embodiments, when one candidate scheduling serving cell group is determined, the first DCI does not include an ID indication field.
2) Corresponding to Manner 2 in the foregoing embodiments, when a quantity of determined candidate scheduling serving cell groups is N (N>1), the first DCI includes an ID indication field indicated by bits whose quantity is obtained by rounding up log 2(N).
3) Corresponding to Manner 3 in the foregoing embodiments, when a quantity of determined candidate scheduling serving cell groups is N (N>1), the first DCI includes an ID indication field indicated by M bits, where M has a fixed value or configured through RRC.

For example, when it is determined that there are a total of seven candidate scheduling serving cell groups (Pcell), (Scell 1), (Scell 2), (Scell 3), (Pcell+Scell 1), (Pcell+Scell 2), and (Pcell+Scell 3), three bits in DCI 0_1 and DCI 1_1 indicate an ID indication field of scheduled serving cell groups.

Corresponding to the related description of the identifier of the candidate resource group in the first information in the foregoing embodiments, in a case that the UE performs the foregoing first step, when the ID indication field of serving cell groups capable of being scheduled exists in the first DCI, the UE may determine an indication ID of each candidate scheduling serving cell group in the first DCI, including at least one of the following:

1) ID correspondingly configured for a candidate scheduling serving cell group
   a) For example, when seven serving cell lists (Pcell), (Scell 1), (Scell 2), (Scell 3), (Pcell+Scell 1), (Pcell+Scell 2), and (Pcell+Scell 3) are configured, IDs 0, 1, 2, 3, 4, 5, and 6 are assigned to indicate corresponding candidate scheduling serving cell groups.
2) An ID (for example, a CIF) of a specific serving cell in a candidate scheduling serving cell group is reused and one bit (for example, the target bit) is added to indicate whether to schedule a plurality of cells.

b) For example, when the CIF value in the DCI is 2 and a field (that is, the target bit) of scheduling a plurality of cells is set to 1, it represents that the DCI indicates scheduling of (Pcell+Scell 2).

In the third step, corresponding to the related steps of implementing step 202a in Implementation 2 above, the UE may determine a DCI length and a candidate PDCCH search space (that is, the foregoing target search space) for scheduling each candidate scheduling serving cell group. That is, all candidate scheduling serving cell groups are grouped, and a DCI length and a candidate PDCCH search space are calculated for each group (one same candidate scheduling serving cell group may exist in a plurality of groups). The grouping rule includes at least one of the following:

1) A separate candidate scheduling serving cell group of a scheduling cell (for example, the Pcell) and all candidate scheduling serving cell groups including the scheduling cell form one group. The candidate scheduling serving cell groups in each group share the same DCI length and candidate PDCCH search space.

For example, all candidate scheduling serving cell groups including the Pcell form one group. For example, when there are seven candidate scheduling serving cell groups (Pcell), (Scell 1), (Scell 2), (Scell 3), (Pcell+Scell 1), (Pcell+Scell 2), and (Pcell+Scell 3), {(Pcell), (Pcell+Scell 1), (Pcell+Scell 2), (Pcell+Scell 3)} form one group. DCI lengths required for scheduling the candidate scheduling serving cell groups in the groups are separately calculated. The largest DCI length in the group is used as the size for scheduling expanded DCI 0_1 and DCI 1_1 in the group. The group share one PDCCH search space, that is, a PDCCH search space corresponding to scheduling of the Pcell. Other candidate scheduling serving cell groups (Scell 1), (Scell 2), and (Scell 3) are separately grouped, and still use a PDCCH search space and a DCI length of cross-carrier scheduling.

2) A separate candidate scheduling serving cell group of a scheduled cell (for example, the Scell) and all candidate scheduling serving cell groups including the scheduled cell form one group. The candidate scheduling serving cell groups in each group share the same DCI length and candidate PDCCH search space.

For example, all candidate scheduling serving cell groups including an Scell j (the value of j is 1, 2 or 3) form one group. For example, when there are seven candidate scheduling serving cell groups (Pcell), (Scell 1), (Scell 2), (Scell 3), (Pcell+Scell 1), (Pcell+Scell 2), and (Pcell+Scell 3), the final groups are {(Pcell)}, {(Scell 1), (Pcell+Scell 1)}, {(Scell 2), (Pcell+Scell 2)}, and {(Scell 3), (Pcell+Scell 3)}. DCI lengths required for scheduling the candidate scheduling serving cell groups in the groups are separately calculated. The largest DCI length in the group is used as the size for scheduling expanded DCI 0_1 and DCI 1_1 in the group. The groups share one PDCCH search space. That is, in the groups, a corresponding PDCCH search space is scheduled according to scheduling of a separate cell.

Finally, when performing a PDCCH blind detection on the determined corresponding DCI length in a PDCCH search space corresponding to each determined candidate scheduling serving cell group, the UE sends and receives data according to the received DCI. When the quantity of the determined candidate scheduling serving cell groups is greater than 1, actually scheduled serving cells are indicated and determined according to the candidate scheduling serving cell group in the DCI, and data is sent and received in these serving cells (for example, a UL cell or a SUL cell).

It needs to be noted that the steps in Embodiment 2 above do not have a strict sequence, and the sequence of the steps may be changed.

For the resource scheduling method provided in the embodiments of the present disclosure, target configuration information may be received, it may be learned that the target configuration information configures N candidate resource groups, the N candidate resource groups support scheduling by downlink control information DCI capable of simultaneously scheduling a plurality of resources, and at least one candidate resource group in the N candidate resource groups is a resource group including at least two candidate resources. Subsequently, a PDCCH blind detection may be performed in search spaces corresponding to the N candidate resource groups according to the target configuration information to obtain first DCI. Finally, data may be transmitted on a target resource actually scheduled by the first DCI, and the target resource includes a candidate resource in one candidate resource group in the N candidate resource groups. In this way, the embodiments of the present disclosure provide a mechanism of using one piece of DCI to simultaneously schedule a plurality of resources, so that it is implemented that the first DCI is used to schedule a plurality of resources represented by the N candidate resource groups. Therefore, in a scenario in which the UE schedules a plurality of resources represented by the N candidate resource groups, PDCCHs of scheduled carriers only need to carry the first DCI but do not need to carry excessive DCI for scheduling individual resources, so that the PDCCH overheads on the scheduled carriers can be reduced.

Figure 4:
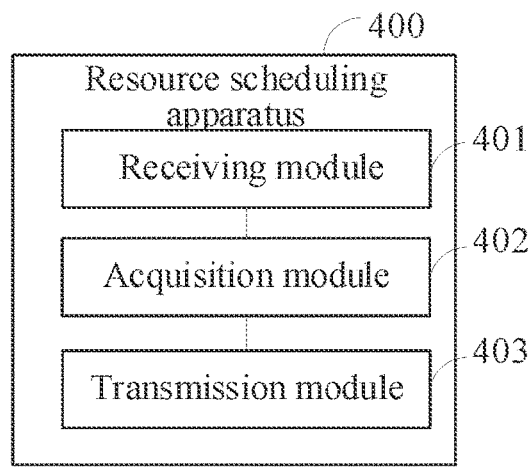
FIG. 4 is a possible schematic structural diagram of a resource scheduling apparatus according to an embodiment of the present disclosure.

FIG. 4 is a possible schematic structural diagram of a resource scheduling apparatus according to an embodiment of the present disclosure. As shown in FIG. 4, the resource scheduling apparatus 400 includes: a receiving module 401, configured to receive target configuration information, where the target configuration information is used for configuring N candidate resource groups, the N candidate resource groups support scheduling by downlink control information DCI capable of simultaneously scheduling a plurality of resources, and at least one candidate resource group in the N candidate resource groups is a resource group including at least two candidate resources; an acquisition module 402, configured to perform a physical downlink control channel PDCCH blind detection in search spaces corresponding to the N candidate resource groups according to the target configuration information received by the receiving module 401 to obtain first DCI; and a transmission module 403, configured to transmit data on a target resource actually scheduled by the first DCI obtained by the acquisition module 402, where the target resource includes a candidate resource in one candidate resource group in the N candidate resource groups, and N is a positive integer.

In some embodiments, one candidate resource includes one carrier of one serving cell configured for UE or a bandwidth part BWP configured for the UE.

In some embodiments, the target configuration information is used for configuring at least one of the following: a target resource group; a scheduled cell being configured to support scheduling by the DCI capable of simultaneously scheduling a plurality of resources; or a scheduling cell being configured to support scheduling by the DCI capable of simultaneously scheduling a plurality of resources, or the scheduling cell being configured to monitor the DCI capable of simultaneously scheduling a plurality of resources.

In some embodiments, the target resource group includes at least one of the following: at least one first resource group;

or at least one second resource group, where the at least one first resource group is a resource group that is configured by the scheduling cell and is capable of being scheduled by the DCI capable of simultaneously scheduling a plurality of resources; and the at least one second resource group and a first resource are capable of being simultaneously scheduled by the DCI capable of simultaneously scheduling a plurality of resources, the first resource is a self-scheduled resource configured by the scheduling cell, and the at least one second resource group is a cross-carrier scheduled resource group configured by the scheduling cell or a resource group on a serving cell different from the scheduling cell.

In some embodiments, in a case that the scheduled cell is configured to support scheduling with the scheduling cell by the DCI capable of simultaneously scheduling a plurality of resources, the target configuration information further includes: information that is configured by the scheduled cell and is about a scheduling cell capable of being jointly scheduled with the scheduled cell.

In some embodiments, if each candidate resource group includes at least two candidate resources, the N candidate resource groups satisfy any one of the following: in a case that the target configuration information is used for configuring the at least one first resource group, the N candidate resource groups are the at least one first resource group; in a case that the target configuration information is used for configuring the at least one second resource group, the each candidate resource group includes a resource group formed by a resource in one second resource group and the first resource; in a case that the scheduled cell is configured to support scheduling with the scheduling cell by the DCI capable of simultaneously scheduling a plurality of resources, the N candidate resource groups include a resource group formed by a resource corresponding to the scheduling cell and a resource corresponding to the scheduled cell and/or a resource group formed by a resource corresponding to the scheduled cell; or in a case that the scheduling cell is configured to support scheduling by the DCI capable of simultaneously scheduling a plurality of resources, or the scheduling cell is configured to monitor the DCI capable of simultaneously scheduling a plurality of resources, the N candidate resource groups include a resource corresponding to the scheduling cell and a resource corresponding to the scheduled cell.

In some embodiments, the N candidate resource groups satisfy any one of the following: in a case that the target configuration information is used for configuring the at least one first resource group, the N candidate resource groups include the at least one first resource group and/or a resource group formed by the first resource; in a case that the target configuration information is used for configuring the at least one second resource group, the N candidate resource groups include the at least one second resource group, a resource group formed by the first resource, and/or a resource group formed by a resource in each second resource group and the first resource; in a case that the scheduled cell is configured to support scheduling with the scheduling cell by the DCI capable of simultaneously scheduling a plurality of resources, the N candidate resource groups include a resource group formed by the first resource, a resource group formed by a resource corresponding to the scheduling cell and a resource corresponding to the scheduled cell, and/or a resource group formed by a resource corresponding to the scheduled cell; or in a case that the scheduling cell is configured to support scheduling by the DCI capable of simultaneously scheduling a plurality of resources, or the scheduling cell is configured to monitor the DCI capable of simultaneously scheduling a plurality of resources, the N candidate resource groups include a resource group formed by the first resource, a resource group formed by a resource corresponding to the scheduling cell and a resource corresponding to the scheduled cell, and/or a resource group formed by a resource corresponding to the scheduled cell.

In some embodiments, the acquisition module 402 is further configured to: determine a first DCI length for scheduling each candidate resource group according to the target configuration information, and determine a target search space for scheduling the each candidate resource group; and perform the PDCCH blind detection in a target search space of a corresponding candidate resource group according to the first DCI length corresponding to the each candidate resource group, where the search spaces corresponding to the N candidate resource groups include target search spaces of all candidate resource groups.

In some embodiments, the target configuration information includes N pieces of first configuration information, and one piece of first configuration information corresponds to one candidate resource group; and the acquisition module 402 is further configured to: determine, according to each piece of first configuration information and field information of at least one DCI field, a first field length of each DCI field corresponding to a candidate resource group of the each first configuration information; and determine the first DCI length of the each candidate resource group according to the first field length of the each DCI field.

In some embodiments, the acquisition module 402 is further configured to use a second DCI length as the first DCI length of the each candidate resource group, where the second DCI length is an initial DCI length of a candidate resource group with the largest initial DCI length in the N candidate resource groups.

In some embodiments, the acquisition module 402 is further configured to: determine a third DCI length according to the target field length of the each DCI field; and use the third DCI length as the first DCI length of the each candidate resource group, where a target field length of any DCI field is a first field length being the largest field length in the first field length of the any DCI field in the N candidate resource groups; and the third DCI length is a sum of target field lengths of the DCI fields.

In some embodiments, if the each candidate resource group includes the at least two candidate resources, the acquisition module 402 is further configured to: determine the target search space for scheduling the each candidate resource group according to first information; or, use a first search space of the each candidate resource group as the target search space for scheduling the corresponding candidate resource group; or, use a target search space set as the target search space for scheduling the each candidate resource group, where the first information is indication information used for indicating the N candidate resource groups or at least one predefined value; and each predefined value corresponds to one search space, and the each candidate resource group corresponds to one predefined value; and the target search space set includes first search spaces of all the candidate resource groups; a first search space of any candidate resource group is a search space of one candidate resource in the any candidate resource group; and a search space of the one candidate resource is a search space when the one candidate resource is separately scheduled.

In some embodiments, the first information includes at least one of the following: an identifier of each candidate resource group, a preset identifier, or an identifier configured in a radio resource control RRC message.

In some embodiments, the N candidate resource groups include at least one group; and the acquisition module 402 is further configured to: determine a first DCI length for scheduling a candidate resource group in each group according to the target configuration information, and determine a target search space for scheduling the candidate resource group in the each group, where the first DCI in all candidate resource groups in one group has the same length, and target search spaces of all the candidate resource groups in the one group are the same.

In some embodiments, the at least one group is obtained through division based on a first candidate resource or at least one second candidate resource, where the first candidate resource is one candidate resource self-scheduled by the scheduling cell, and one second candidate resource is one candidate resource cross-carrier scheduled by the scheduling cell.

In some embodiments, the N candidate resource groups include a first group and a second group, where the at least one group is obtained through division based on the first candidate resource, and each first group includes a candidate resource group including the first candidate resource; and each second group includes a candidate resource group formed by the one second candidate resource; and if the at least one group is obtained through division based on the at least one second candidate resource, candidate resource groups included in the each first group all include one same second candidate resource; and the each second group includes a candidate resource group formed by the first candidate resource.

In some embodiments, a first DCI length of the each candidate resource group in any first group is a first DCI length of a candidate resource group with the largest first DCI length in the any first group; and a first DCI length of a candidate resource group in any second group is a first DCI length when a candidate resource in the candidate resource group in the any second group is separately scheduled.

In some embodiments, if the at least one group is obtained through division based on the first candidate resource, a target search space of the candidate resource group in the each first group is a search space when the first candidate resource is separately scheduled; and a target search space of the candidate resource group in the any second group is a search space when a second candidate resource in the candidate resource group in the any second group is separately scheduled; and if the at least one group is obtained through division based on the at least one second candidate resource, a target search space of a candidate resource group in the any first group is a search space when a second candidate resource in a candidate resource group in the any first group is separately scheduled; and a target search space of the candidate resource group in the any second group is a search space when the candidate resource in the candidate resource group in the any second group is separately scheduled.

In some embodiments, the first DCI length of the each candidate resource group is associated with at least one serving cell, or the first DCI length of the each candidate resource group is associated with at least one serving cell group, where each serving cell corresponds to one DCI length budget, and each serving cell group corresponds to one DCI length budget.

In some embodiments, the DCI length budget corresponding to the each serving cell group is obtained based on the DCI length budget of the each serving cell in the corresponding serving cell group.

In some embodiments, the resource scheduling apparatus 400 further includes: a determining module, configured to: if a first DCI length of a first candidate resource group is associated with a first serving cell, after the acquisition module 402 determines a first DCI length for scheduling each candidate resource group, determine, according to the first DCI length of the first candidate resource group, whether the first serving cell satisfies a DCI length budget of the first serving cell; or, if a first DCI length of a first candidate resource group is associated with a first serving cell group, after the acquisition module 402 determines a first DCI length for scheduling each candidate resource group, determine, according to the first DCI length of the first candidate resource group, whether the first serving cell group satisfies a DCI length budget of the first serving cell group, where the first candidate resource group is at least one of the N candidate resource groups.

In some embodiments, the target search space includes at least one of the following: a search space time-frequency monitoring position or a control channel element (CCE).

In some embodiments, in a case that N is 1, the first DCI does not include a target field; and in a case that N is greater than 1, a field length of the target field is a value obtained by rounding up $\log 2(N)$ or a field length of the target field is a preset value, where the target field is a DCI field used for indicating the N candidate resource groups.

In some embodiments, an identifier of one candidate resource group includes at least one of the following: identification information ID configured for the one candidate resource group, an identifier of one candidate resource in the one candidate resource group, or an identifier and a target bit of one candidate resource in the one candidate resource group, where one target bit is used for indicating whether the corresponding candidate resource group includes a plurality of candidate resources.

The resource scheduling apparatus provided in the embodiments of the present disclosure can implement any process in the foregoing method embodiments, for example, the process shown in FIG. 2 or FIG. 3. To avoid repetition, details are not described herein again.

For the resource scheduling apparatus provided in the embodiments of the present disclosure, target configuration information may be received, it may be learned that the target configuration information configures N candidate resource groups, the N candidate resource groups support scheduling by downlink control information DCI capable of simultaneously scheduling a plurality of resources, and at least one candidate resource group in the N candidate resource groups is a resource group including at least two candidate resources. Subsequently, a PDCCH blind detection may be performed in search spaces corresponding to the N candidate resource groups according to the target configuration information to obtain first DCI. Finally, data may be transmitted on a target resource actually scheduled by the first DCI, and the target resource includes a candidate resource in one candidate resource group in the N candidate resource groups. In this way, the embodiments of the present disclosure provide a mechanism of using one piece of DCI to simultaneously schedule a plurality of resources, so that it is implemented that the first DCI is used to schedule a plurality of resources represented by the N candidate resource groups. Therefore, in a scenario in which the UE schedules a plurality of resources represented by the N candidate resource groups, PDCCHs of scheduled carriers only need to carry the first DCI but do not need to carry excessive DCI for scheduling individual resources, so that the PDCCH overheads on the scheduled carriers can be reduced.

In a case that integrated units are used, the foregoing acquisition module 401, determining module, and the like may be integrated in one processing module for implementation. The foregoing processing module may be a processor or a controller, for example, may be a CPU, a general-purpose processor, a Digital Signal Processor (DSP), an Application-Specific Integrated Circuit (ASIC), a Field Programmable Gate Array (FPGA) or another programmable logic device, transistor logic device, hardware component or any combination thereof. The processor may implement or perform various examples of logic blocks, modules, and circuits described with reference to content disclosed in the present disclosure. The foregoing processing module may be a combination to implement a computing function, for example, may be a combination of one or more microprocessors, or a combination of a DSP and a microprocessor. The storage module may be a memory.

Figure 5:
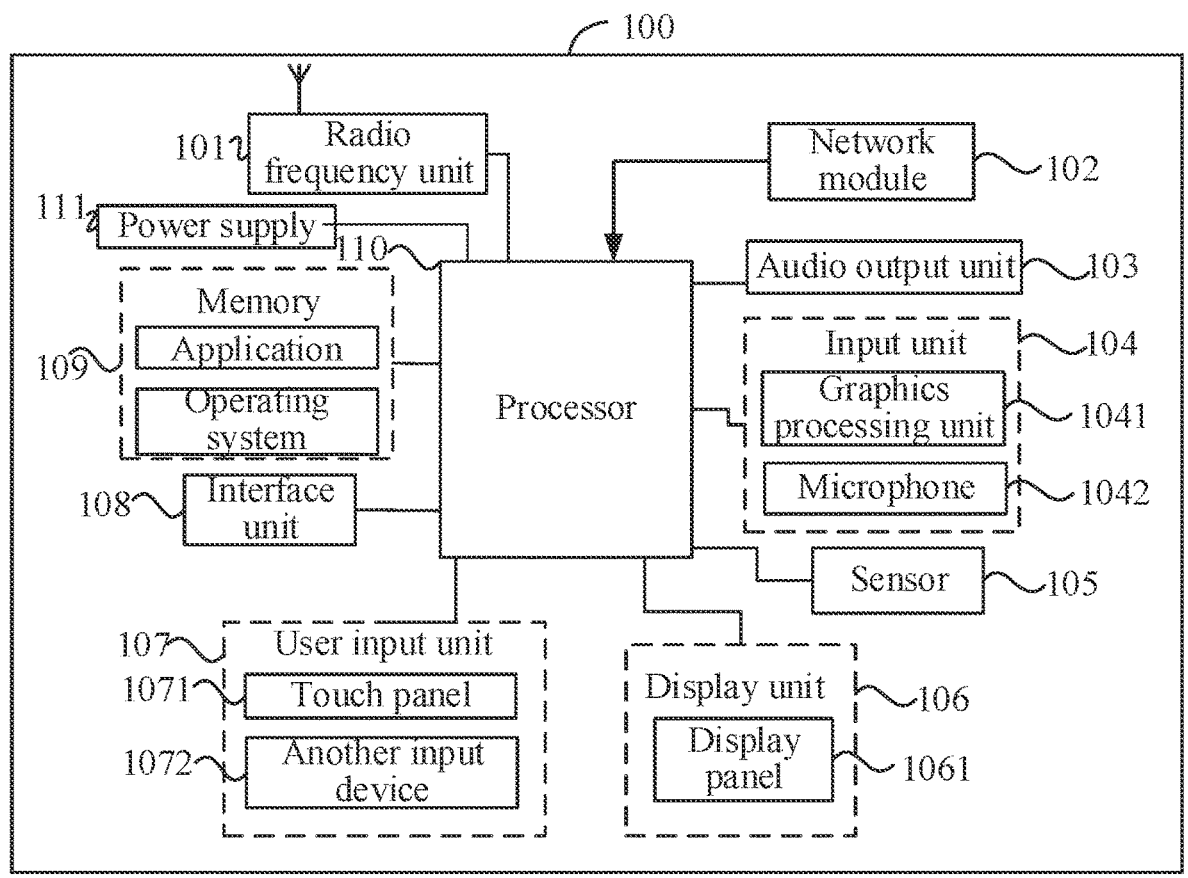
FIG. 5 is a possible schematic structural diagram of UE according to an embodiment of the present disclosure.

FIG. 5 is a schematic structural diagram of hardware of UE that implements the embodiments of the present disclosure. The terminal 100 includes, but is not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the UE 100 shown in FIG. 5 does not constitute any limitation on the terminal device, and instead, the UE 100 may include more or fewer components than those shown in the figure, or some components may be combined, or a different component deployment may be used. In the embodiments of the present disclosure, the UE 100 includes, but is not limited to, a mobile phone, a tablet computer, a notebook computer, a palmtop computer, an in-vehicle terminal device, a wearable device, a pedometer, and the like.

The interface unit 108 is configured to receive target configuration information, where the target configuration information is used for configuring N candidate resource groups of which scheduling is supported by first downlink control information DCI, and each candidate resource group includes at least one candidate resource. The processor 110 is configured to perform a physical downlink control channel PDCCH blind detection on the N candidate resource groups according to the target configuration information received by the interface unit 108 to obtain first DCI. The radio frequency unit 101 and/or the interface unit 108 is configured to transmit data on a target resource actually scheduled by the first DCI obtained by the processor 110, where the target resource includes at least one candidate resource in the N candidate resource groups, and N is a positive integer.

It needs to be noted that the foregoing interface unit 108 may be formed by the receiving module 401 in the foregoing resource scheduling apparatus 400, and the processor 110 may be formed by the acquisition module 402 and the determining module in the foregoing resource scheduling apparatus 400. The foregoing radio frequency unit 101 may be formed by the receiving module 401 or the transmission module 403 in the foregoing resource scheduling apparatus 400.

In addition, the foregoing radio frequency unit 101 and interface unit 108 may be formed by the receiving module 401 or the transmission module 403.

For the UE provided in the embodiments of the present disclosure, target configuration information may be received, it may be learned that the target configuration information configures N candidate resource groups, the N candidate resource groups support scheduling by downlink control information DCI capable of simultaneously scheduling a plurality of resources, and at least one candidate resource group in the N candidate resource groups is a resource group including at least two candidate resources. Subsequently, a PDCCH blind detection may be performed in search spaces corresponding to the N candidate resource groups according to the target configuration information to obtain first DCI. Finally, data may be transmitted on a target resource actually scheduled by the first DCI, and the target resource includes a candidate resource in one candidate resource group in the N candidate resource groups. In this way, the embodiments of the present disclosure provide a mechanism of using one piece of DCI to simultaneously schedule a plurality of resources, so that it is implemented that the first DCI is used to schedule a plurality of resources represented by the N candidate resource groups. Therefore, in a scenario in which the UE schedules a plurality of resources represented by the N candidate resource groups, PDCCHs of scheduled carriers only need to carry the first DCI but do not need to carry excessive DCI for scheduling individual resources, so that the PDCCH overheads on the scheduled carriers can be reduced.

It should be understood that in the embodiments of the present disclosure, the radio frequency unit 101 may be configured to receive and send a signal during an information receiving and sending process or a call process. In some embodiments, the radio frequency unit receives downlink data from a base station, and then delivers the downlink data to the processor 110 for processing; and in addition, sends uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device through a wireless communications system and network.

The UE 100 provides wireless broadband Internet access for a user by using the network module 102, for example, helps the user to receive and send an email, browse a webpage, and access stream media, and the like.

The audio output unit 103 may convert audio data received by the radio frequency unit 101 or the network module 102 or stored on the memory 109 into audio signals and output the audio signals as sounds. Moreover, the audio output unit 103 may provide an audio output (such as call signal receiving sound or message receiving sound) related to a specific function executed by the UE 100. The audio output unit 103 includes a speaker, a buzzer, a receiver, and the like.

The input unit 104 is configured to receive an audio signal or a video signal. The input unit 104 may include a GPU 1041 and a microphone 1042. The GPU 1041 processes image data of a static picture or a video that is obtained by an image acquisition apparatus (for example, a camera) in a video acquisition mode or an image acquisition mode. An image frame that has been processed may be displayed on a display unit 106. The image frame that has been processed by the GPU 1041 may be stored in the memory 109 (or another storage medium) or sent by using the radio frequency unit 101 or the network module 102. The microphone 1042 may receive a sound, and can process the sound into audio data. The processed audio data may be converted, in a phone talk mode, into a format that may be sent to a mobile communication base station via the radio frequency unit 101 for output.

The UE 100 further includes at least one sensor 105 such as an optical sensor, a motion sensor, and other sensors. In some embodiments, the optical sensor includes an ambient light sensor and a proximity sensor, where the ambient light sensor may adjust luminance of the display panel 1061 according to the luminance of the ambient light, and the proximity sensor may switch off the display panel 1061 and/or backlight when the UE 100 is moved to the ear. As one type of motion sensor, an acceleration sensor may detect magnitude of accelerations in various directions (generally on three axes), may detect magnitude and a direction of the gravity when static, and may be configured to recognize the attitude of the terminal device (for example, switching between landscape orientation and portrait orientation, a related game, and magnetometer attitude calibration), a function related to vibration recognition (such as a pedometer and a knock), and the like. The sensor 105 may further include a fingerprint sensor, a pressure sensor, an iris sensor, a molecular sensor, a gyroscope, a barometer, a hygrometer, a thermometer, and an infrared sensor, and the like. Details are not described herein again.

The display unit 106 is configured to display information inputted by the user or information provided for the user. The display unit 106 may include a display panel 1061. The display panel 1061 may be configured in the form of a Liquid Crystal Display (LCD), an Organic Light-Emitting Diode (OLED), or the like.

The user input unit 107 may be configured to receive input digit or character information, and generate key signal input related to the user setting and function control of the UE 100. In some embodiments, the user input unit 107 includes a touch panel 1071 and another input device 1072. The touch panel 1071, also referred to as a touchscreen, may collect a touch operation of a user on or near the touch panel (such as an operation of a user on or near the touch panel 1071 by using any suitable object or attachment, such as a finger or a touch pen). The touch panel 1071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 110. Moreover, the touch controller receives and executes a command sent from the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. In some embodiments, the another input device 1072 may include, but not limited to, a physical keyboard, a functional key (such as a volume control key or a switch key), a track ball, a mouse, and a joystick. Details are not described herein again.

Further, the touch panel 1071 may cover the display panel 1061. After detecting a touch operation on or near the touch panel, the touch panel 1071 transfers the touch operation to the processor 110, so as to determine a type of the touch event. Then, the processor 110 provides corresponding visual output on the display panel 1061 according to the type of the touch event. Although, in FIG. 5, the touch panel 1071 and the display panel 1061 are used as two separate parts to implement input and output functions of the UE 100, in some embodiments, the touch panel 1071 and the display panel 1061 may be integrated to implement the input and output functions of the UE 100, which are not limited herein.

The interface unit 108 is an interface for connecting an external apparatus to the UE 100. For example, the external apparatus may include a wired or wireless headset port, an external power supply (or a battery charger) port, a wired or wireless data port, a storage card port, a port used to connect an apparatus having an identification module, an audio input/output (IO) port, a video/O port, an earphone port, and the like. The interface unit 108 may be configured to receive an input (such as data information or electric power) from an external apparatus and transmit the received input to one or more elements in the UE 100 or may be configured to transmit data between the UE 100 and an external apparatus.

The memory 109 may be configured to store a software program and various data. The memory 109 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 109 may include a high-speed random access memory, and may further include a nonvolatile memory, such as at least one magnetic disk storage device, a flash memory, or another volatile solid-state storage device.

The processor 110 is the control center of the UE 100, and is connected to various parts of the UE 100 by using various interfaces and lines. By running or executing the software program and/or module stored in the memory 109, and invoking data stored in the memory 109, the processor 110 performs various functions and data processing of the UE 100, thereby performing overall monitoring on the UE 100. The processor 110 may include one or more processing units. In some embodiments, the processor 110 may integrate an application processor and a modem processor. The application processor mainly processes an operating system, a user interface, an application, and the like. The modem processor mainly processes wireless communication. It may be understood that the modulation and demodulation processor may not be integrated into the processor 110.

The UE 100 further includes a power supply 111 (such as a battery) for supplying power to the components. In some embodiments, the power supply 111 may be logically connected to the processor 110 by using a power management system, thereby implementing functions such as charging, discharging, and power consumption management by using the power management system.

In addition, the UE 100 includes some functional modules that are not shown. Details are not described herein again.

In some embodiments, the embodiments of the present disclosure further provide UE, including a processor (for example, the foregoing processor 110) and a memory (for example, the foregoing memory 109) and a computer program stored in the memory and capable of being run on the processor, where the computer program, when being executed by the processor, implements the process of the resource scheduling method in the embodiments, and can achieve the same technical effects. To avoid repetition, details are not described herein again.

The embodiments of the present disclosure further provide a computer-readable storage medium, storing a computer program, where the computer program, when being executed by a processor (for example, the processor 110), implements various processes of the foregoing resource scheduling method in the embodiments, and can achieve the same technical effects. To avoid repetition, details are not described herein again. The computer-readable storage medium includes, for example, a Read-Only Memory (ROM), a Random Access Memory (RAM), a magnetic disk, an optical disc or the like.

Through the description of the foregoing implementations, a person skilled in the art may clearly understand that, for the purpose of convenient and brief description, only division of the foregoing functional modules is used as an example for description. In the practical application, the functions may be allocated to and completed by different function modules according to requirements. That is, an internal structure of the device is divided into different functional modules, to complete all or some of the functions described above. For specific work processes of the system, the apparatus, and the modules described above, reference may be made to corresponding processes in the foregoing method embodiments, and details are not described herein again.

In the several embodiments provided in the embodiments of the present disclosure, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

Functional modules in the embodiments of the present disclosure may be integrated into one processing module (for example, the foregoing processor 110), or each of the units may exist alone physically, or two or more modules are integrated into one unit. The integrated module may be implemented in the form of hardware, or may be implemented in a form of a software functional module.

If implemented in the form of software functional modules and sold or used as an independent product, the foregoing integrated module may be stored in a computer-readable storage medium. Based on such an understanding, the technical solutions in the present disclosure essentially, or the part contributing to the prior art, or all or some of the technical solutions may be implemented in the form of a computer software product. The computer software product is stored in a storage medium and includes several instructions for instructing a computer device (which may be a personal computer, a server, a network device or the like) or a CPU to perform all or some of the steps of the resource scheduling method in the embodiments of the present disclosure. The storage medium includes various media that may store processing code, such as a USB flash drive, a removable hard disk, a Read-Only Memory (ROM), a Random Access Memory (RAM), a magnetic disk, and an optical disc.

It should be noted that the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented by means of software and a necessary general hardware platform, and certainly, may also be implemented by hardware. The computer software product is stored in a storage medium (such as a ROM/RAM, a magnetic disk, or an optical disc) and includes several instructions for instructing a terminal device (which may be a mobile phone, a computer, a server, an air conditioner, a network device, or the like) to perform the methods described in various embodiments of the present disclosure.

The embodiments of the present disclosure have been described above with reference to the accompanying drawings. The present disclosure is not limited to the specific embodiments described above, and the specific embodiments described above are merely exemplary and not limitative. Those of ordinary skill in the art may make various variations under the teaching of the present disclosure without departing from the spirit of the present disclosure and the protection scope of the claims, and such variations shall all fall within the protection scope of the present disclosure.

What is claimed is:

1. A method for resource scheduling, comprising:
   receiving target configuration information, wherein the target configuration information is used for configuring N candidate resource groups, the N candidate resource groups support scheduling by downlink control information (DCI) configured for simultaneously scheduling a plurality of resources, and at least one candidate resource group in the N candidate resource groups is a resource group comprising at least two candidate resources;
   performing a physical downlink control channel (PDCCH) blind detection in search spaces corresponding to the N candidate resource groups according to the target configuration information to obtain first DCI; and
   transmitting data on a target resource actually scheduled by the first DCI,
   wherein:
   the performing a PDCCH blind detection in search spaces corresponding to the N candidate resource groups according to the target configuration information comprises:
     determining a first DCI length for scheduling each candidate resource group according to the target configuration information, and determining a target search space for scheduling the each candidate resource group; and
     performing the PDCCH blind detection in a target search space of a corresponding candidate resource group according to the first DCI length corresponding to the each candidate resource group, wherein the search spaces corresponding to the N candidate resource groups comprise target search spaces of all candidate resource groups; and
   the target resource comprises a candidate resource in one candidate resource group in the N candidate resource groups, and N is a positive integer.

2. The method according to claim 1, wherein one candidate resource comprises one carrier of one serving cell configured for user equipment (UE).

3. The method according to claim 1, wherein the target configuration information is used for configuring at least one of the following:
- a target resource group, or
- the scheduling cell being configured to monitor the DCI configured for simultaneously scheduling a plurality of resources.

4. The method according to claim 3, wherein the target resource group comprises
- at least one first resource group,
- wherein the at least one first resource group is a resource group that is configured by the scheduling cell and is configured to be scheduled by the DCI configured for simultaneously scheduling a plurality of resources.

5. The method according to claim 4, wherein when each candidate resource group comprises at least two candidate resources, the N candidate resource groups satisfy:
- when the target configuration information is used for configuring the at least one first resource group, the N candidate resource groups are the at least one first resource group.

6. The method according to claim 1, wherein the target configuration information comprises N pieces of first configuration information, and one piece of first configuration information corresponds to one candidate resource group; and
- the determining a first DCI length for scheduling each candidate resource group according to the target configuration information comprises:
  - determining, according to each piece of first configuration information and field information of at least one DCI field, a first field length of each DCI field corresponding to a candidate resource group of the each first configuration information; and
  - determining the first DCI length of the each candidate resource group according to the first field length of the each DCI field.

7. The method according to claim 6, wherein the determining the first DCI length of the each candidate resource group according to the first field length of the each DCI field comprises:
- determining an initial DCI length of the each candidate resource group according to the first field length of the each DCI field; and
- using a second DCI length as the first DCI length of the each candidate resource group, wherein the second DCI length is an initial DCI length of a candidate resource group with the largest initial DCI length in the N candidate resource groups.

8. The method according to claim 1, wherein when the each candidate resource group comprises the at least two candidate resources, the determining a target search space for scheduling the each candidate resource group comprises:
- determining the target search space for scheduling the each candidate resource group according to first information,
  - wherein the first information is indication information used for indicating the N candidate resource groups.

9. The method according to claim 8, wherein the first information comprises an identifier configured in a radio resource control RRC message.

10. The method according to claim 1, wherein the N candidate resource groups comprise at least one group; and
- the determining a first DCI length for scheduling each candidate resource group according to the target configuration information, and determining a target search space for scheduling the each candidate resource group comprises:
  - determining a first DCI length for scheduling a candidate resource group in each group according to the target configuration information, and determining a target search space for scheduling the candidate resource group in the each group,
  - wherein the first DCI in all candidate resource groups in one group has the same length, and target search spaces of all the candidate resource groups in the one group are the same.

11. The method according to claim 10, wherein the at least one group is obtained through division based on a first candidate resource or at least one second candidate resource,
- wherein the first candidate resource is one candidate resource self-scheduled by the scheduling cell, and one second candidate resource is one candidate resource cross-carrier scheduled by the scheduling cell.

12. The method according to claim 11, wherein the N candidate resource groups comprise a first group and a second group,
- wherein the at least one group is obtained through division based on the first candidate resource, and each first group comprises a candidate resource group comprising the first candidate resource; and each second group comprises a candidate resource group formed by the one second candidate resource; and
- when the at least one group is obtained through division based on the at least one second candidate resource, candidate resource groups comprised in the each first group all comprise one same second candidate resource; and the each second group comprises a candidate resource group formed by the first candidate resource.

13. The method according to claim 12, wherein
- a first DCI length of the each candidate resource group in any first group is a first DCI length of a candidate resource group with the largest first DCI length in the any first group; and
- a first DCI length of a candidate resource group in any second group is a first DCI length when a candidate resource in the candidate resource group in the any second group is separately scheduled.

14. The method according to claim 13, wherein
- when the at least one group is obtained through division based on the first candidate resource, a target search space of the candidate resource group in the each first group is a search space when the first candidate resource is separately scheduled; and a target search space of the candidate resource group in the any second group is a search space when a second candidate resource in the candidate resource group in the any second group is separately scheduled; and
- when the at least one group is obtained through division based on the at least one second candidate resource, a target search space of a candidate resource group in the any first group is a search space when a second candidate resource in a candidate resource group in the any first group is separately scheduled; and a target search space of the candidate resource group in the any second group is a search space when the candidate resource in the candidate resource group in the any second group is separately scheduled.

15. The method according to claim 1, wherein the first DCI length of the each candidate resource group is associated with at least one serving cell.

16. The method according to claim 15, wherein when the first DCI length of a first candidate resource group is associated with a first serving cell, after the determining a first DCI length for scheduling each candidate resource group, the method further comprises:
determining, according to the first DCI length of the first candidate resource group, whether the first serving cell satisfies a DCI length budget of the first serving cell.

17. The method according to claim 1, wherein:
when N is 1, the first DCI does not comprise a target field; and
when N is greater than 1, a field length of the target field is a value obtained by rounding up log 2(N) or a field length of the target field is a preset value,
wherein the target field is a DCI field used for indicating the N candidate resource groups.

18. The method according to claim 1, wherein an identifier of one candidate resource group comprises identification information ID configured for the one candidate resource group.

19. UE, comprising: a memory storing a computer program; and a processor coupled to the memory and configured to execute the computer program to perform operations comprising:
receiving target configuration information, wherein the target configuration information is used for configuring N candidate resource groups, the N candidate resource groups support scheduling by downlink control information (DCI) configured for simultaneously scheduling a plurality of resources, and at least one candidate resource group in the N candidate resource groups is a resource group comprising at least two candidate resources;
performing a physical downlink control channel (PDCCH) blind detection in search spaces corresponding to the N candidate resource groups according to the target configuration information to obtain first DCI; and
transmitting data on a target resource actually scheduled by the first DCI,
wherein:
the performing a PDCCH blind detection in search spaces corresponding to the N candidate resource groups according to the target configuration information comprises:
determining a first DCI length for scheduling each candidate resource group according to the target configuration information, and determining a target search space for scheduling the each candidate resource group; and
performing the PDCCH blind detection in a target search space of a corresponding candidate resource group according to the first DCI length corresponding to the each candidate resource group, wherein the search spaces corresponding to the N candidate resource groups comprise target search spaces of all candidate resource groups; and
the target resource comprises a candidate resource in one candidate resource group in the N candidate resource groups, and N is a positive integer.

20. A non-transitory computer-readable storage medium, storing a computer program, when the computer program is executed by a processor, causes the processor to perform operations comprising:
receiving target configuration information, wherein the target configuration information is used for configuring N candidate resource groups, the N candidate resource groups support scheduling by downlink control information (DCI) configured for simultaneously scheduling a plurality of resources, and at least one candidate resource group in the N candidate resource groups is a resource group comprising at least two candidate resources;
performing a physical downlink control channel (PDCCH) blind detection in search spaces corresponding to the N candidate resource groups according to the target configuration information to obtain first DCI; and
transmitting data on a target resource actually scheduled by the first DCI,
wherein:
the performing a PDCCH blind detection in search spaces corresponding to the N candidate resource groups according to the target configuration information comprises:
determining a first DCI length for scheduling each candidate resource group according to the target configuration information, and determining a target search space for scheduling the each candidate resource group; and
performing the PDCCH blind detection in a target search space of a corresponding candidate resource group according to the first DCI length corresponding to the each candidate resource group, wherein the search spaces corresponding to the N candidate resource groups comprise target search spaces of all candidate resource groups; and
the target resource comprises a candidate resource in one candidate resource group in the N candidate resource groups, and N is a positive integer.

* * * * *